US008836822B2

(12) United States Patent
Imaoka

(10) Patent No.: US 8,836,822 B2
(45) Date of Patent: Sep. 16, 2014

(54) TEMPERATURE-COMPENSATED ZOOM LENS SYSTEM

(71) Applicant: Konica Minolta Advance Layers, Inc., Tokyo (JP)

(72) Inventor: Masayuki Imaoka, Osaka (JP)

(73) Assignee: Konica Minolta Advanced Layers, Inc., Tokyo (JP)

( * ) Notice: Subject to any disclaimer, the term of this patent is extended or adjusted under 35 U.S.C. 154(b) by 95 days.

(21) Appl. No.: 13/624,518

(22) Filed: Sep. 21, 2012

(65) Prior Publication Data

US 2013/0070123 A1    Mar. 21, 2013

(30) Foreign Application Priority Data

Sep. 21, 2011    (JP) ................. 2011-205638

(51) Int. Cl.
| | |
|---|---|
| H04N 5/262 | (2006.01) |
| G02B 15/15 | (2006.01) |
| G02B 15/14 | (2006.01) |
| G03B 21/14 | (2006.01) |
| G02B 27/00 | (2006.01) |
| G02B 15/177 | (2006.01) |

(52) U.S. Cl.
CPC ............. G02B 15/14 (2013.01); G03B 21/14 (2013.01); G02B 27/0025 (2013.01); H04N 5/262 (2013.01); G02B 15/177 (2013.01)
USPC ........ 348/240.3; 359/677; 359/679; 359/686; 359/689; 359/690

(58) Field of Classification Search
USPC ............... 348/240.99–240.3, 208.11, 224.1; 359/676–692
See application file for complete search history.

(56) References Cited

U.S. PATENT DOCUMENTS

| | | | | |
|---|---|---|---|---|
| 5,831,771 | A  * | 11/1998 | Suzuki ......................... | 359/689 |
| 6,028,715 | A  * | 2/2000  | Takamoto et al. ............ | 359/688 |
| 6,650,487 | B2 * | 11/2003 | Mori ............................. | 359/772 |
| 6,665,131 | B2 * | 12/2003 | Suzuki et al. ................. | 359/778 |
| 6,710,932 | B2 * | 3/2004  | Kitaoka et al. ................ | 359/686 |
| 7,545,578 | B2 * | 6/2009  | Sugita .......................... | 359/680 |
| 8,064,145 | B2 * | 11/2011 | Yasui ............................ | 359/691 |
| 8,149,517 | B2 * | 4/2012  | Ohashi ......................... | 359/687 |
| 2002/0048093 | A1 * | 4/2002 | Suzuki et al. ................ | 359/752 |
| 2003/0137746 | A1 | 7/2003 | Kitaoka | |
| 2008/0239507 | A1 | 10/2008 | Sugita | |
| 2011/0032606 | A1 | 2/2011 | Imaoka | |

FOREIGN PATENT DOCUMENTS

| | | |
|---|---|---|
| JP | 8-297244 | 11/1996 |
| JP | 2003-248171 | 9/2003 |
| JP | 2008-242402 | 10/2008 |
| JP | 2011-53663 | 3/2011 |

* cited by examiner

*Primary Examiner* — Timothy J Henn
*Assistant Examiner* — Pritham Prabhakher
(74) *Attorney, Agent, or Firm* — Cozen O'Connor

(57) ABSTRACT

A zoom lens system used in a spectrum region including visible light has movable lens groups moved for zooming, and has, in a movable lens group, a negative lens element made of a material fulfilling the conditional formulae Vd<55 and 0.0018×Vd+P<0.65 and, in a movable lens group, a positive lens element made of a material fulfilling the conditional formulae 60<Vd, 0.645<0.0018×Vd+P, and $9 \times 10^{-6} < dN/dT$, where Vd is the Abbe number for a d-line; P=(Ng−NF)/(NF−NC); Ng, NF, and NC are the refractive indices for the g-, F-, and C-lines respectively; and dN/dT is the variation rate in refractive index accompanying variation in room temperature. The negative and positive lens elements move in the same direction during zooming.

19 Claims, 16 Drawing Sheets

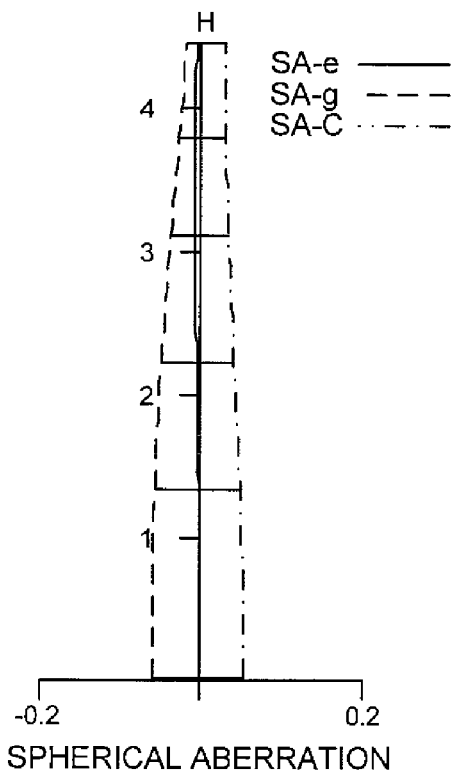
FIG.3A EX1 (T,∞)
SPHERICAL ABERRATION
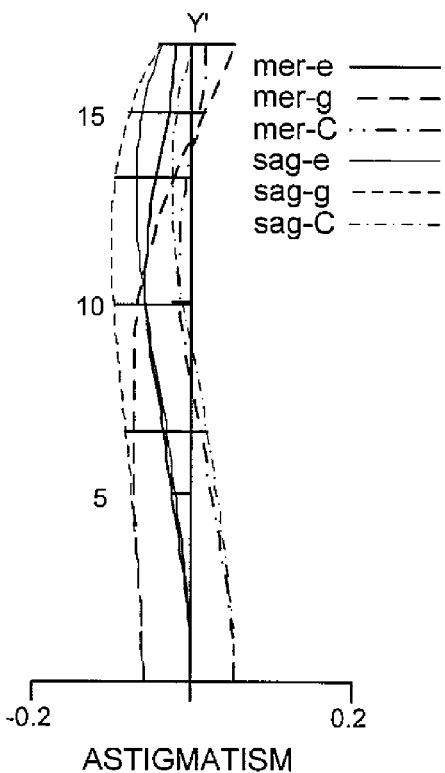
FIG.3B EX1 (T,∞)
ASTIGMATISM
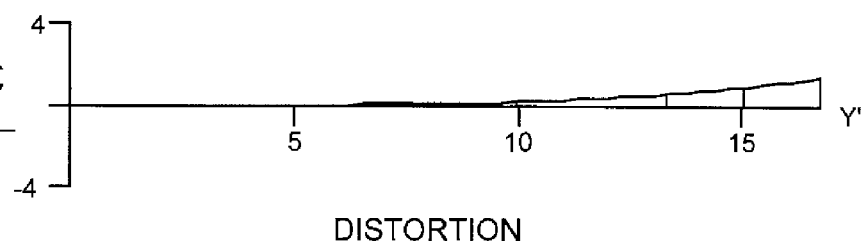
FIG.3C EX1 (T,∞)
DISTORTION
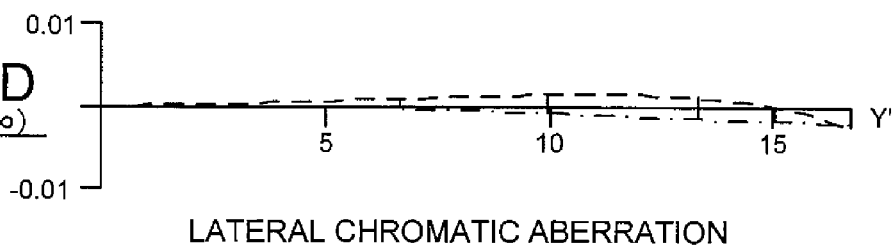
FIG.3D EX1 (T,∞)
LATERAL CHROMATIC ABERRATION

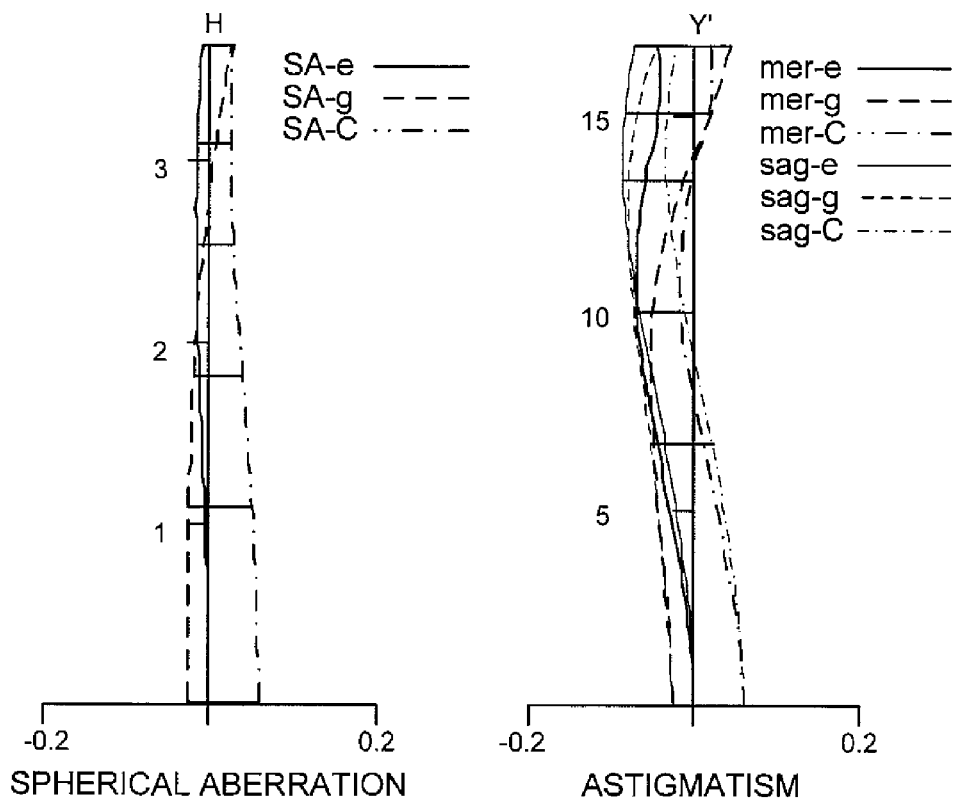
FIG.4A EX1 (T,N)
SPHERICAL ABERRATION
FIG.4B EX1 (T,N)
ASTIGMATISM
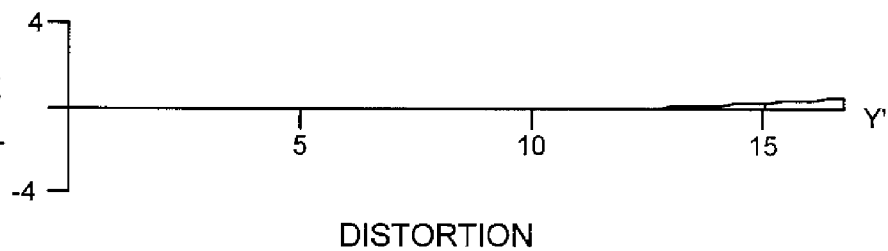
FIG.4C EX1 (T,N)
DISTORTION
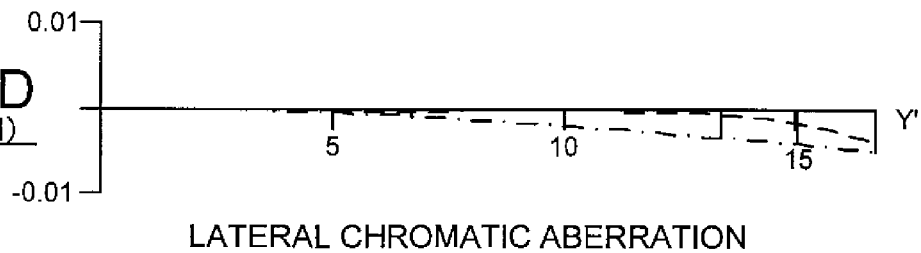
FIG.4D EX1 (T,N)
LATERAL CHROMATIC ABERRATION FIG.5A EX1 (M,∞)
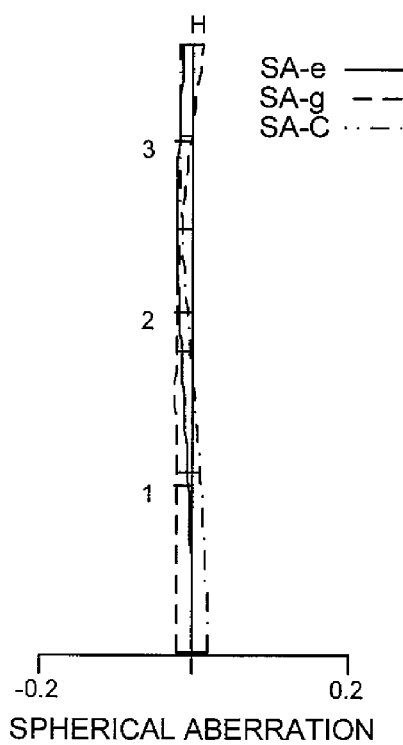
SPHERICAL ABERRATION
FIG.5B EX1 (M,∞)
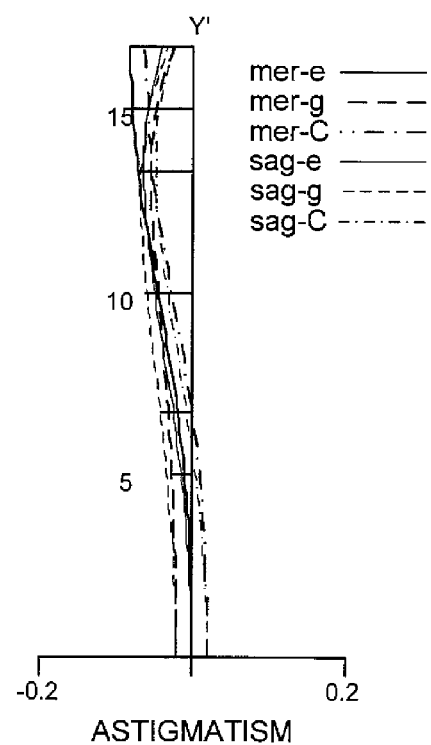
ASTIGMATISM
FIG.5C EX1 (M,∞)
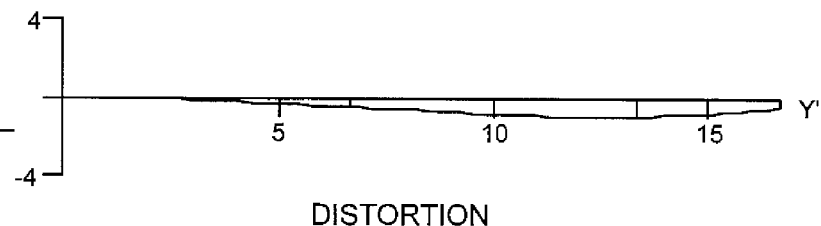
DISTORTION
FIG.5D EX1 (M,∞)
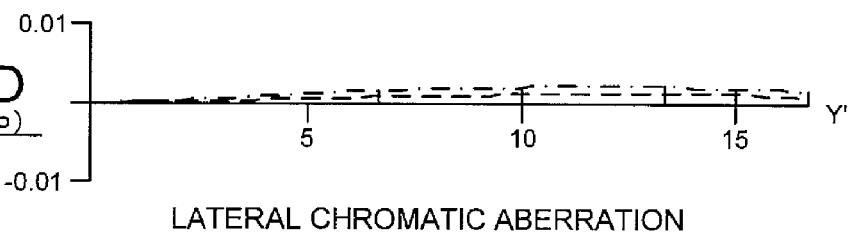
LATERAL CHROMATIC ABERRATION FIG.6A EX1 (M,N)
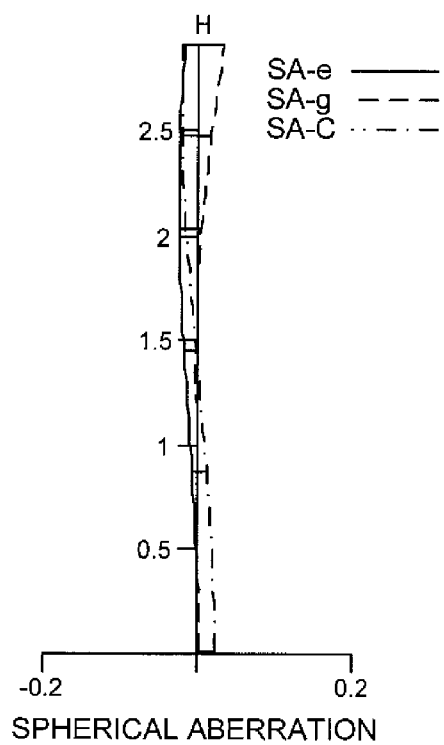
SPHERICAL ABERRATION
FIG.6B EX1 (M,N)
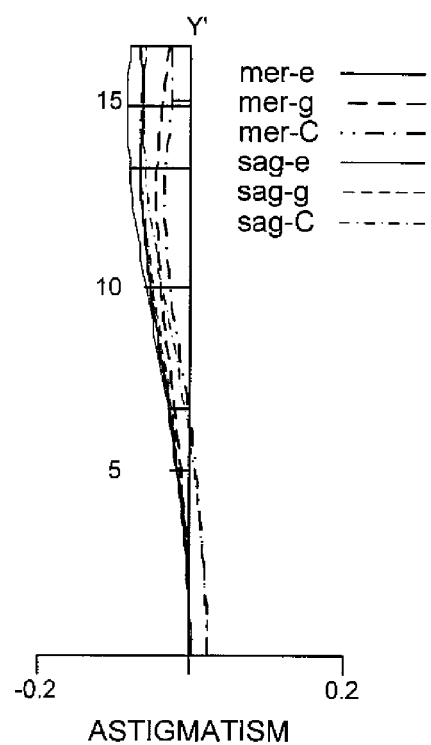
ASTIGMATISM
FIG.6C EX1 (M,N)
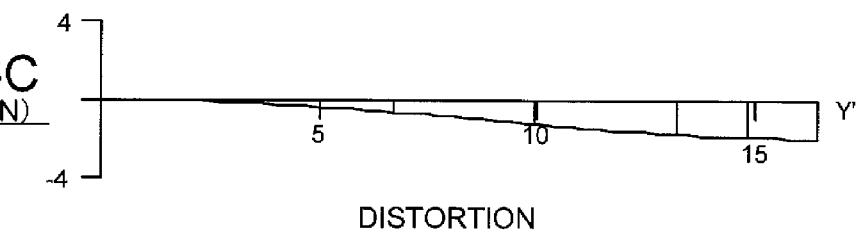
DISTORTION
FIG.6D EX1 (M,N)
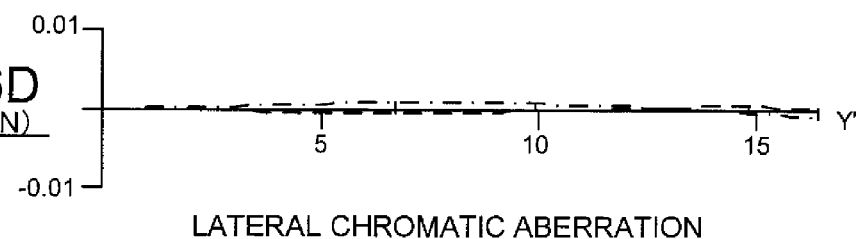
LATERAL CHROMATIC ABERRATION

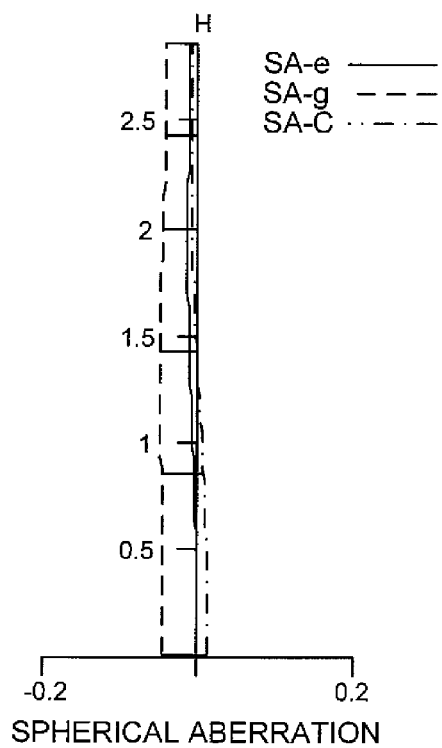
FIG.7A EX1 (W,∞)
SPHERICAL ABERRATION
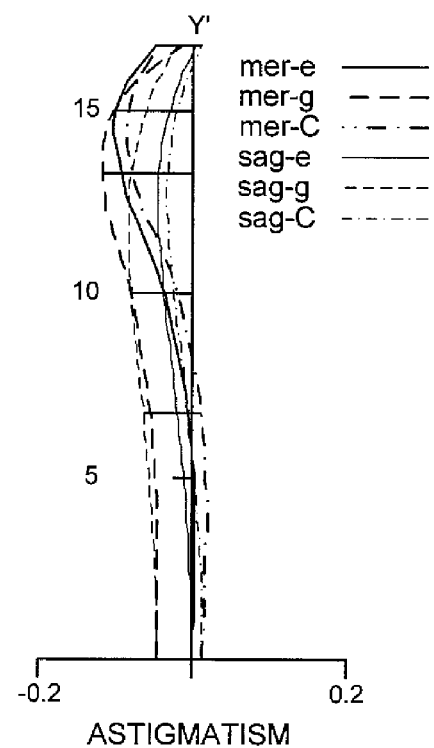
FIG.7B EX1 (W,∞)
ASTIGMATISM
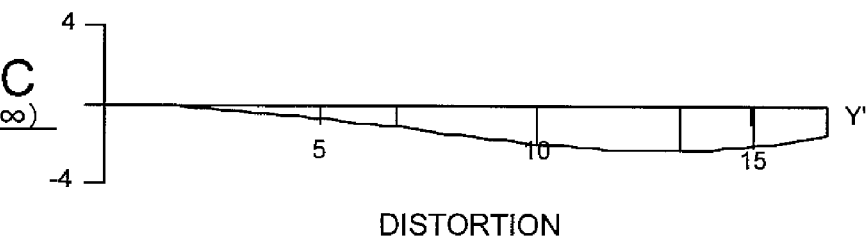
FIG.7C EX1 (W,∞)
DISTORTION
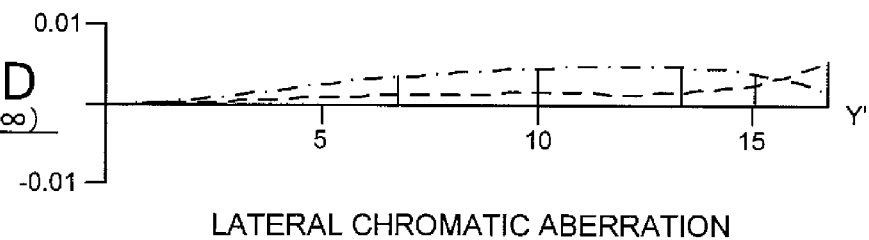
FIG.7D EX1 (W,∞)
LATERAL CHROMATIC ABERRATION FIG.8A EX1 (W,N)
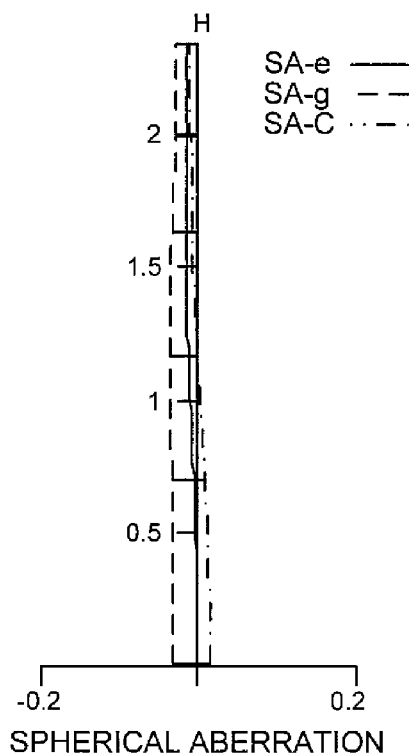
SPHERICAL ABERRATION
FIG.8B EX1 (W,N)
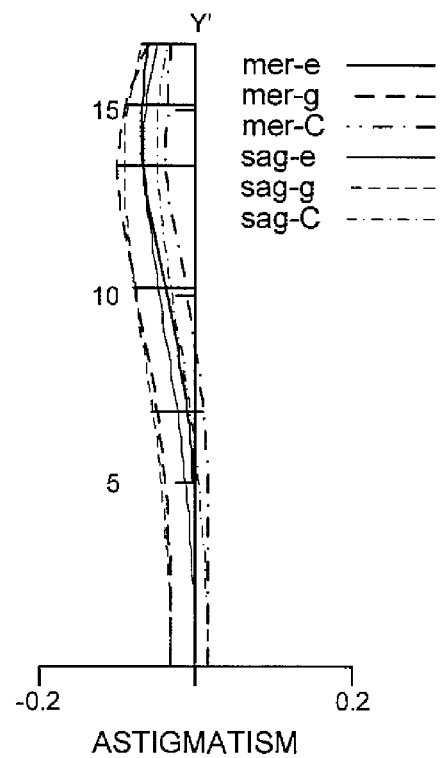
ASTIGMATISM
FIG.8C EX1 (W,N)
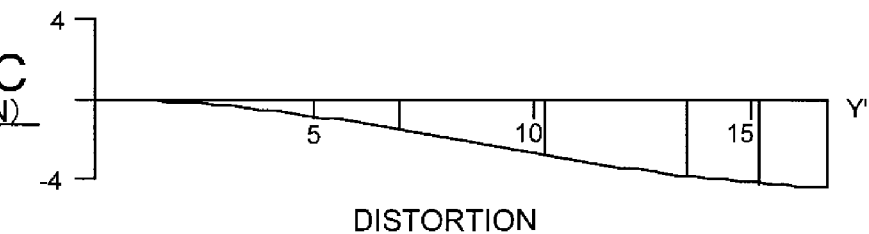
DISTORTION
FIG.8D EX1 (W,N)
LATERAL CHROMATIC ABERRATION

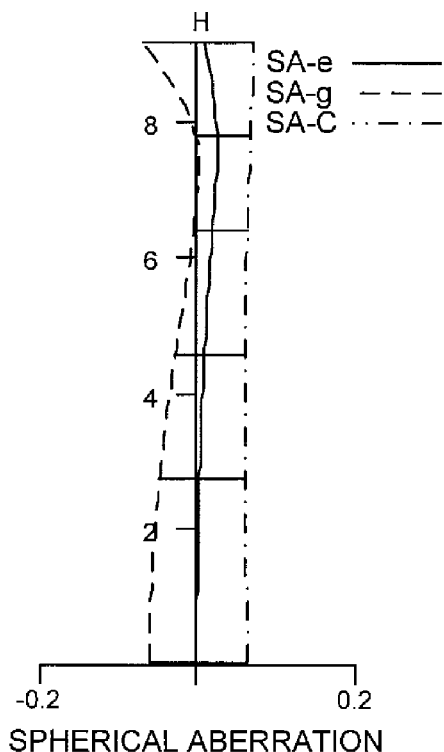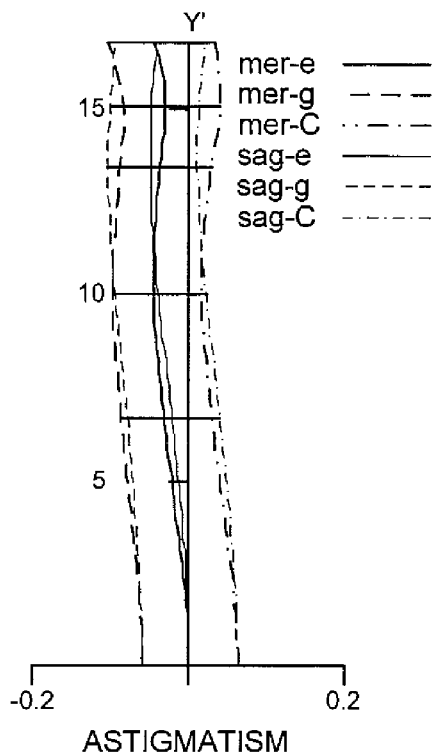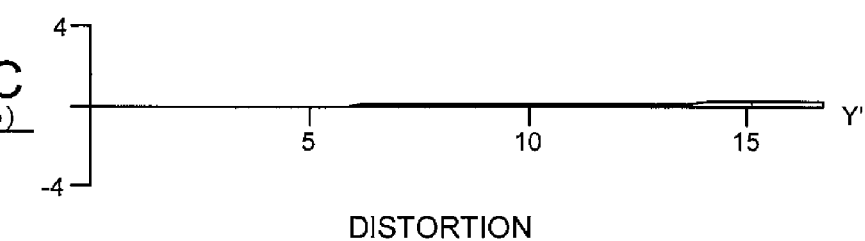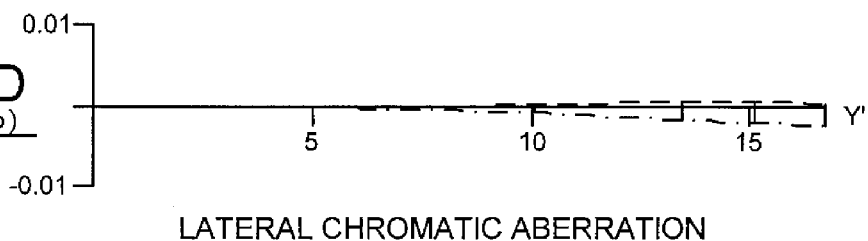

FIG.10A EX2 (T,N)
FIG.10B EX2 (T,N)
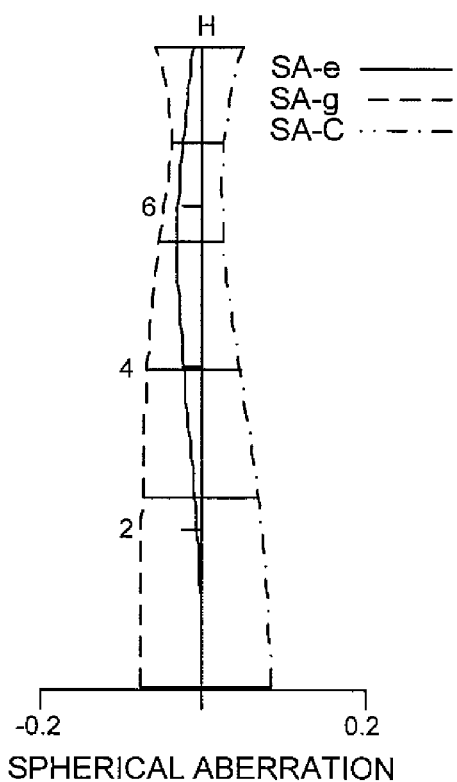
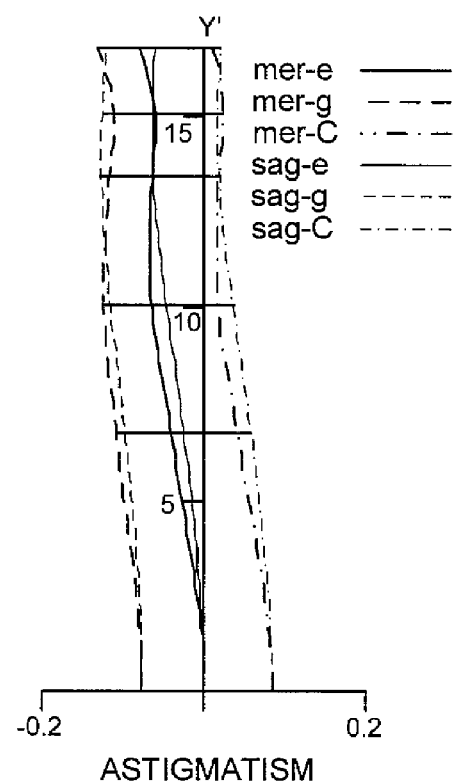
SPHERICAL ABERRATION
ASTIGMATISM
FIG.10C EX2 (T,N)
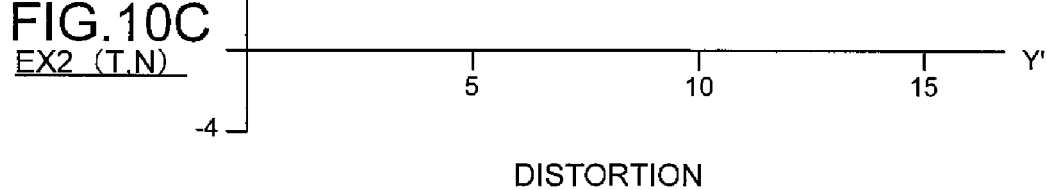
DISTORTION
FIG.10D EX2 (T,N)
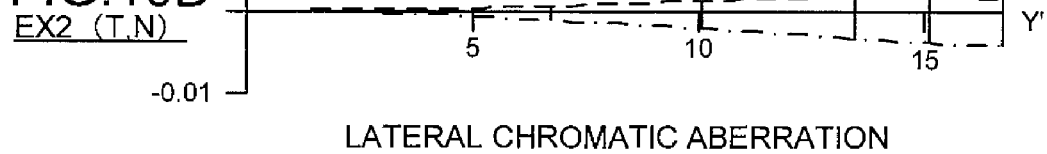
LATERAL CHROMATIC ABERRATION

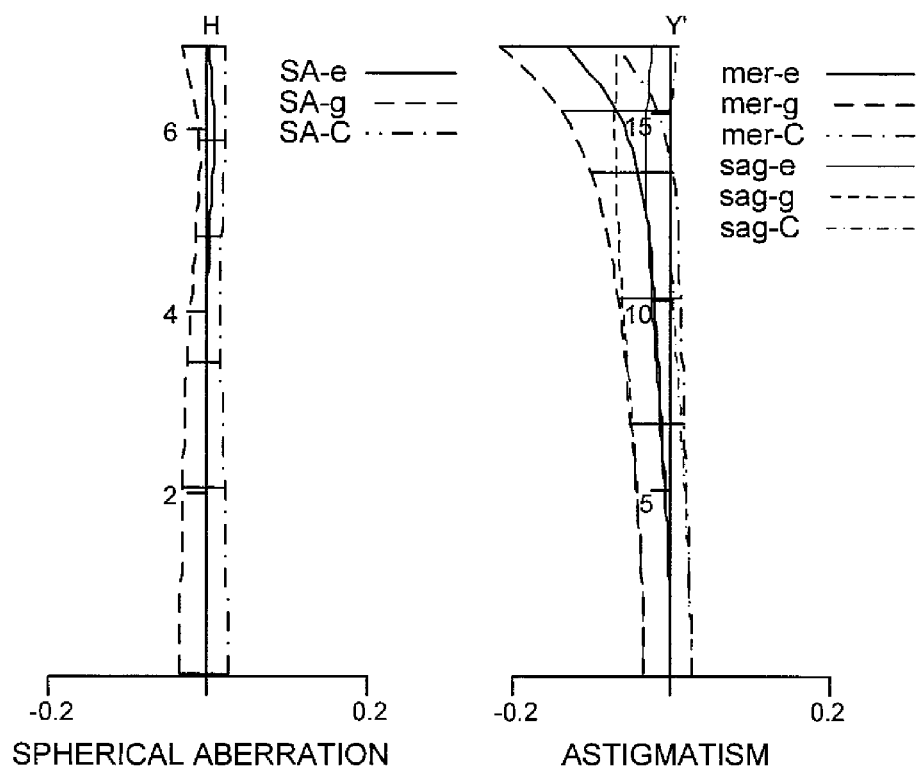
FIG.11A EX2 (M,∞)
SPHERICAL ABERRATION
FIG.11B EX2 (M,∞)
ASTIGMATISM
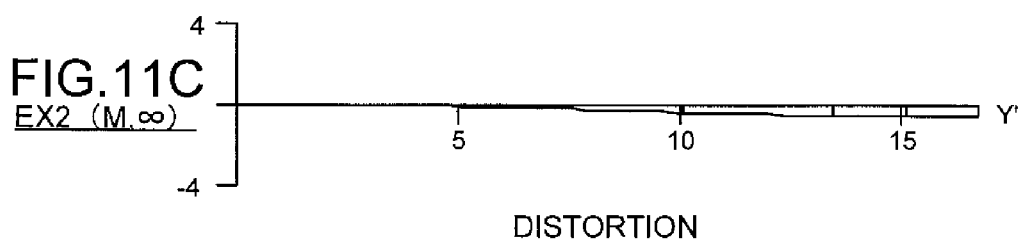
FIG.11C EX2 (M,∞)
DISTORTION
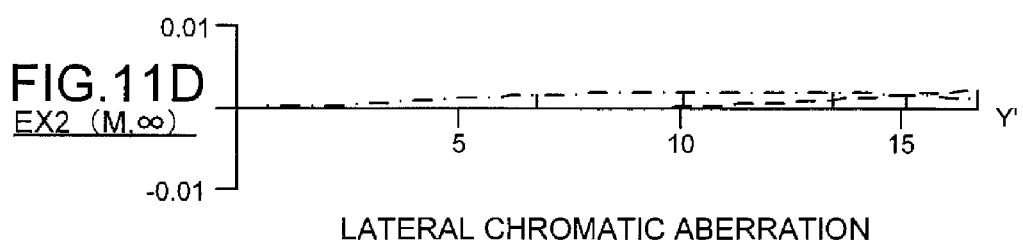
FIG.11D EX2 (M,∞)
LATERAL CHROMATIC ABERRATION FIG.12A EX2 (M,N)
FIG.12B EX2 (M,N)
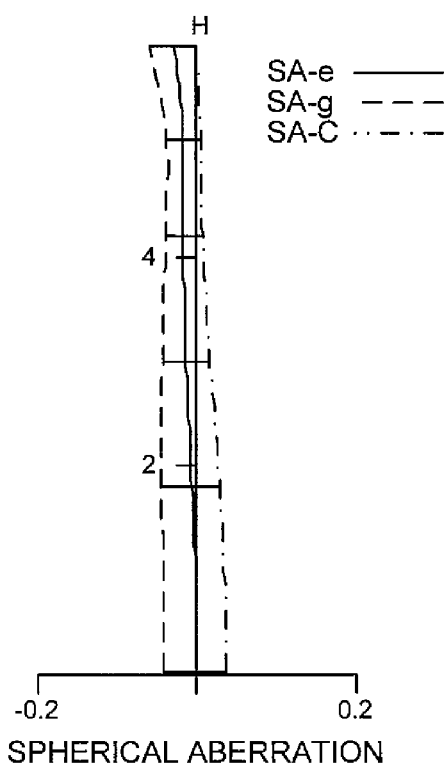
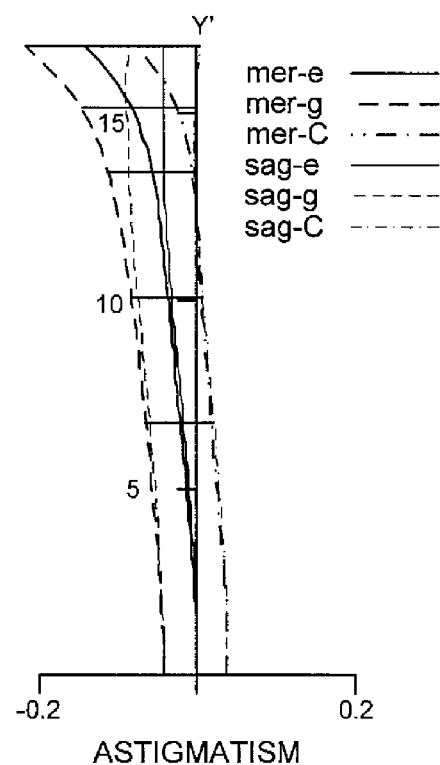
SPHERICAL ABERRATION
ASTIGMATISM
FIG.12C EX2 (M,N)
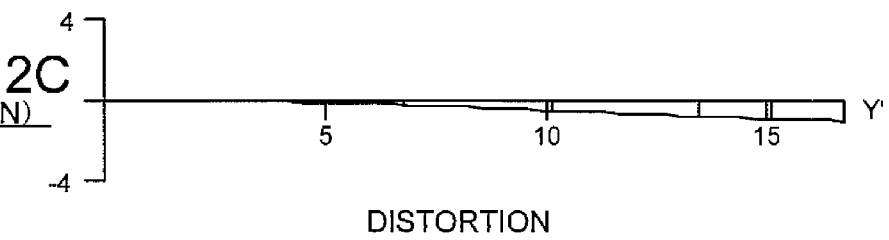
DISTORTION
FIG.12D EX2 (M,N)
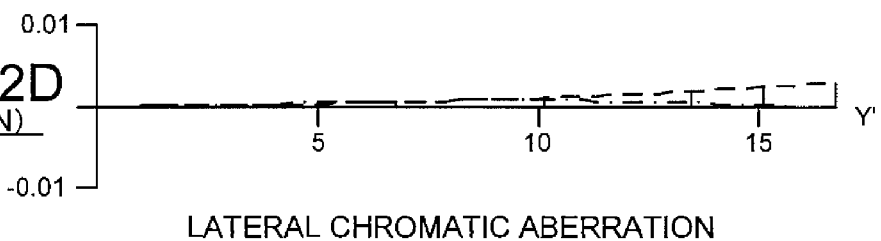
LATERAL CHROMATIC ABERRATION

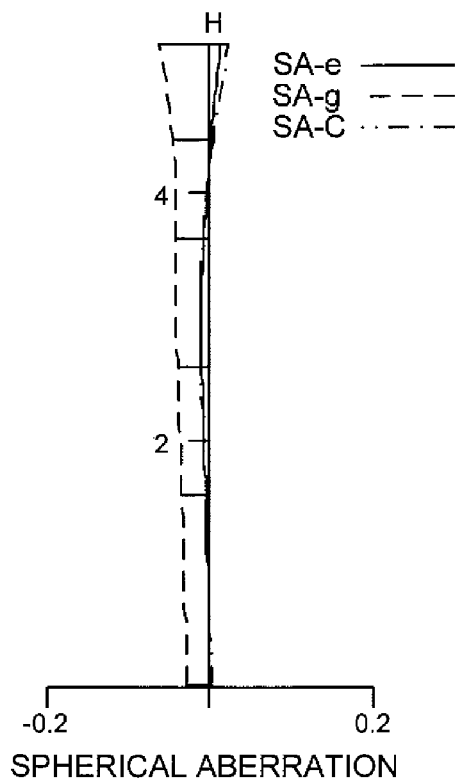
FIG.13A EX2 (W,∞)
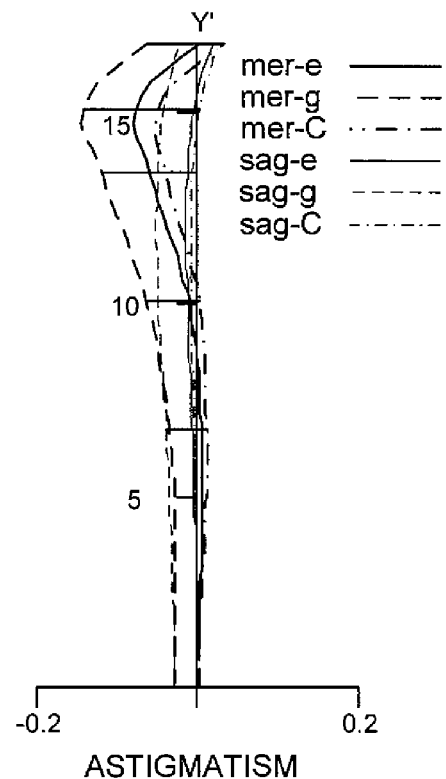
FIG.13B EX2 (W,∞)
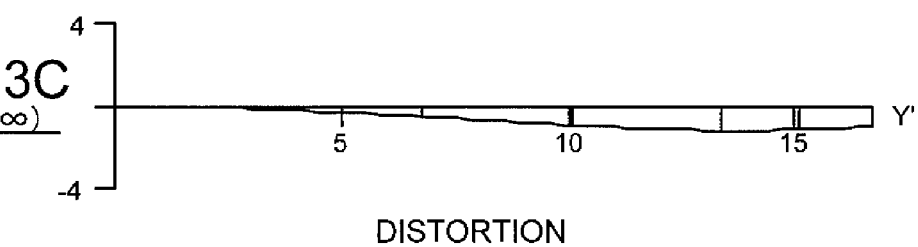
FIG.13C EX2 (W,∞)
DISTORTION
FIG.13D EX2 (W,∞)
LATERAL CHROMATIC ABERRATION FIG.14A EX2 (W,N)
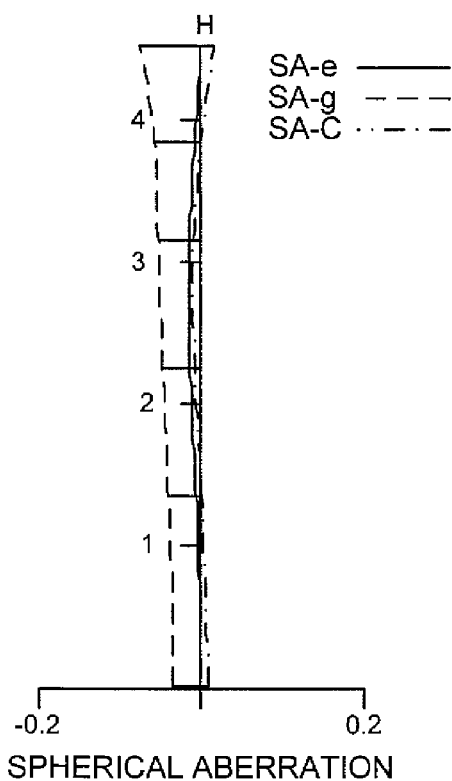
SPHERICAL ABERRATION
FIG.14B EX2 (W,N)
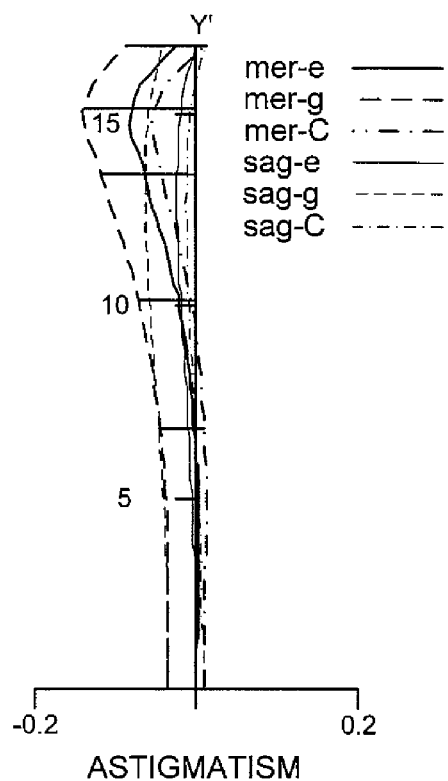
ASTIGMATISM
FIG.14C EX2 (W,N)
DISTORTION
FIG.14D EX2 (W,N)
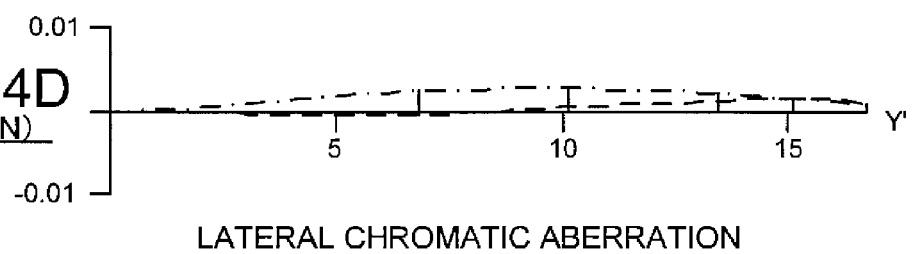
LATERAL CHROMATIC ABERRATION

TEMPERATURE-COMPENSATED ZOOM LENS SYSTEM

This application is based on Japanese Patent Application No. 2011-205638 filed on Sep. 21, 2011, the contents of which are hereby incorporated by reference.

BACKGROUND OF THE INVENTION

1. Field of the Invention

The present invention relates to zoom lens systems, and more particularly to temperature-compensated zoom lens systems provided with the functions of correcting focus deviation accompanying variation in temperature and of correcting chromatic aberration.

2. Description of Related Art

To obtain a high-resolution optical system, it is essential to suppress chromatic aberration. In correcting the secondary spectrum of chromatic aberration, materials with high anomalous dispersion are very effective. These materials, however, exhibit large variation in refractive index accompanying variation in temperature, and thus tend to suffer from the problem of focus deviation. Patent Documents 1 to 4 listed below propose optical systems addressing the problem.

For example, according to Patent Document 1, with a view to reducing chromatic aberration and simultaneously reducing focus deviation accompanying variation in temperature during zooming, in a lens unit other than a focusing unit, at least one positive lens element made of an anomalous dispersion glass with low refractive index and low dispersion and at least one negative lens element made of a glass with high refractive index, high dispersion, and small temperature-related variation in refractive index are used to build the proposed zoom lens system. According to Patent Document 2, the thermal expansion of a lens barrel is exploited to correct focus deviation in the proposed zoom lens system. In this zoom lens system, a lens barrel that couples a plastic lens element and an image sensor together is made of a material with a linear expansion coefficient corresponding to the displacement of the focus position. Thus, as temperature rises, the lens barrel expands along the optical axis, and thereby cancels the focus deviation resulting from variation in the refractive index of the lens element.

Patent Document 3 discloses a zoom lens system in which conditions related to focal length and anomalous dispersion are so set as to reduce chromatic aberration and focus deviation. Patent Document 4 discloses an optical system in which the focus deviation occurring in anomalous dispersion glass provided for correction of chromatic aberration is corrected for with quartz glass.

Patent Document 1: JP-A-H8-297244
Patent Document 2: JP-A-2003-248171
Patent Document 3: JP-A-2008-242402
Patent Document 4: JP-A-2011-53663

Inconveniently, however, none of the optical systems disclosed in Patent Documents 1 to 4 can correct chromatic aberration and focus deviation both satisfactorily. For example, the zoom lens system disclosed in Patent Document 1 provides only a small effect of correcting both chromatic aberration and focus deviation. The zoom lens system disclosed in Patent Document 3, employing no or only one anomalous dispersion glass lens element, can suppress focus deviation but is hardly effective in correcting chromatic aberration.

The zoom lens system disclosed in Patent Document 2 may encounter cases such as where, for the sake of compactness, the lens barrel cannot be made long enough along the optical axis to secure the desired expansion stroke and where, for the sake of structural strength, the lens barrel cannot be made of a material with a proper linear expansion coefficient. This limits the extent to which focus deviation can be corrected, and thus makes it difficult to correct focus deviation satisfactorily. Another problem is that it is not possible to reduce variation in zooming-induced focus deviation between different focal lengths. The optical system disclosed in Patent Document 4 is directed to a single-focal-length lens system. Thus, Patent Document 4 teaches nothing about a method of correcting variation in focus deviation between different focal lengths which is peculiar to zoom lens systems.

SUMMARY OF THE INVENTION

Devised against the background discussed above, the present invention aims to provide a zoom lens system that corrects chromatic aberration satisfactorily and that suppresses focus deviation accompanying variation in temperature so as to reduce variation in the amount of focus deviation between different focal lengths.

According to one aspect of the invention, a zoom lens system which is used in a spectrum region including visible light and which includes a plurality of movable lens groups that are moved for zooming is provided with: in at least one of the movable lens groups, at least one negative lens element made of a material that fulfills conditional formulae (1) and (2) below; and in at least one of the movable lens groups, at least one positive lens element made of a material that fulfills conditional formulae (3), (4), and (5) below, the negative and positive lens elements moving in the same direction along the optical axis during zooming:

$$Vd<55 \tag{1}$$

$$0.0018 \times Vd + P < 0.65 \tag{2}$$

$$60<Vd \tag{3}$$

$$0.645 < 0.0018 \times Vd + P \tag{4}$$

$$9 \times 10^{-6} < dN/dT \tag{5}$$

where
Vd represents the Abbe number for the d-line, $P=(Ng-NF)/(NF-NC)$,

Ng represents the refractive index for the g-line,
NF represents the refractive index for the F-line,
NC represents the refractive index for the C-line, and
dN/dT represents the rate of variation in refractive index accompanying variation in temperature around room temperature.

According to another aspect of the invention, a digital appliance is provided with: a zoom lens system which is used in a spectrum region including visible light and which includes a plurality of movable lens groups that are moved for zooming; and an image sensor which converts an optical image formed on the sensing surface thereof into an electrical signal, the digital appliance being thereby additionally furnished with at least one of a function of shooting a still image of a subject and a function of shooting a moving image of a subject. Here, the zoom lens system is arranged such that an optical image of a subject is formed on the sensing surface of the image sensor, and comprises: in at least one of the movable lens groups, at least one negative lens element made of a material that fulfills conditional formulae (1) and (2) above; and in at least one of the movable lens groups, at least one positive lens element made of a material that fulfills conditional formulae (3), (4), and (5) above, the negative and positive lens elements moving in a same direction along an optical axis during zooming.

According to yet another aspect of the invention, a projector is provided with: an image display device which displays an image; a light source; an illumination optical system which directs light from the light source to the image display device; and a zoom lens system which projects the image displayed on the image display device onto a screen surface on an enlarged scale. Here, the zoom lens system is provided with: in at least one movable lens group, at least one negative lens element made of a material that fulfills conditional formulae (1) and (2) above; and in at least one movable lens group, at least one positive lens element made of a material that fulfills conditional formulae (3), (4), and (5) above, the negative and positive lens elements moving in a same direction along an optical axis during zooming.

BRIEF DESCRIPTION OF THE DRAWINGS

FIGS. 3A to 3D are aberration diagrams of Example 1 at the telephoto end, when focusing on the infinite object distance;
FIGS. 4A to 4D are aberration diagrams of Example 1 at the telephoto end, when focusing on the closest object distance;
FIGS. 5A to 5D are aberration diagrams of Example 1 at the middle position, when focusing on the infinite object distance;
FIGS. 6A to 6D are aberration diagrams of Example 1 at the middle position, when focusing on the closest object distance;
FIGS. 7A to 7D are aberration diagrams of Example 1 at the wide-angle end, when focusing on the infinite object distance;
FIGS. 8A to 8D are aberration diagrams of Example 1 at the wide-angle end, when focusing on the closest object distance;
FIGS. 9A to 9D are aberration diagrams of Example 2 at the telephoto end, when focusing on the infinite object distance;
FIGS. 10A to 10D are aberration diagrams of Example 2 at the telephoto end, when focusing on the closest object distance;
FIGS. 11A to 11D are aberration diagrams of Example 2 at the middle position, when focusing on the infinite object distance;
FIGS. 12A to 12D are aberration diagrams of Example 2 at the middle position, when focusing on the closest object distance;
FIGS. 13A to 13D are aberration diagrams of Example 2 at the wide-angle end, when focusing on the infinite object distance;
FIGS. 14A to 14D are aberration diagrams of Example 2 at the wide-angle end, when focusing on the closest object distance.

DETAILED DESCRIPTION OF PREFERRED EMBODIMENTS

Figure 1A:
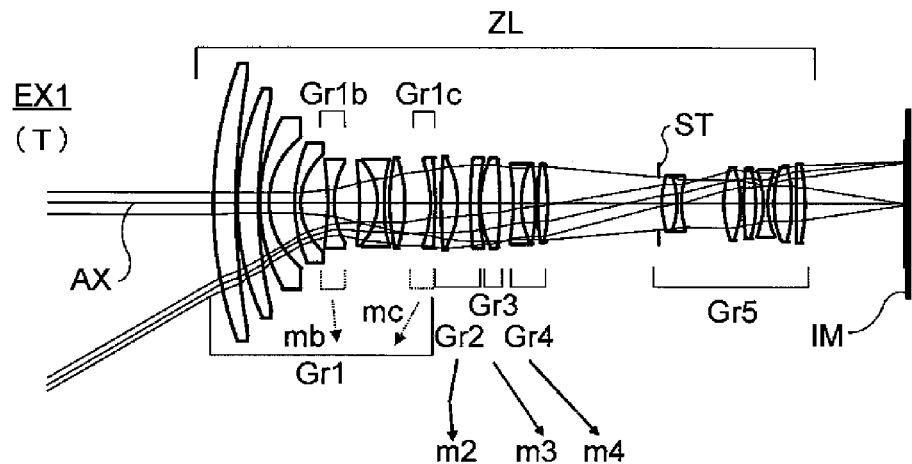
FIGS. 1A to 1C are optical path diagrams of the first embodiment (Example 1)

Hereinafter, zoom lens systems etc. according to the present invention will be described. A zoom lens system according to the invention is used in a spectrum region including visible light and has a plurality of movable lens groups as lens groups that are moved for zooming. At least one of the movable lens groups includes at least one negative lens element made of a material that fulfills conditional formulae (1) and (2) below, and at least one of the movable lens groups includes at least one positive lens element made of a material that fulfills conditional formulae (3), (4), and (5) below, these negative and positive lens elements moving in the same direction along the optical axis during zooming:

$$Vd < 55 \tag{1}$$

$$0.0018 \times Vd + P < 0.65 \tag{2}$$

$$60 < Vd \tag{3}$$

$$0.645 < 0.0018 \times Vd + P \tag{4}$$

$$9 \times 10^{-6} < dN/dT \tag{5}$$

where
Vd represents the Abbe number for the d-line, $$P = (Ng - NF)/(NF - NC),$$

Ng represents the refractive index for the g-line,
NF represents the refractive index for the F-line,
NC represents the refractive index for the C-line, and
dN/dT represents the rate of variation in refractive index accompanying variation in temperature around room temperature.

In general, to correct the secondary spectrum of chromatic aberration, it is necessary to use a positive lens element made of an anomalous low-dispersion glass or a negative lens element made of a glass having the opposite anomaly. For sufficient correction, a plurality of such lens elements need to be used. However, an anomalous low-dispersion glass tends to have a large negative value as the rate dN/dT of variation in refractive index accompanying variation in temperature, and a glass having the opposite anomaly tends to have a large positive value of dN/dT; thus, using a number of them causes large focus deviation accompanying variation in temperature, leading to degraded image quality. By using, in addition to those lens elements, a positive lens element made of a material having a large positive value of dN/dT, it is possible to cancel the focus deviation that accompanies variation in temperature, and thereby to prevent degradation in image quality. So long as this material has a comparatively low dispersion with a standard to somewhat high anomalous dispersion, the secondary spectrum of chromatic aberration does not deteriorate.

Giving a zooming movable lens group an effect of correcting chromatic aberration is not very desirable because doing so leads to variation in chromatic aberration during zooming. However, to correct chromatic aberration precisely with a limited number of lens elements, not only a stationary lens group but also a movable lens group needs to be given an effect of correcting chromatic aberration. For the reason mentioned above, a glass having an effect of correcting chromatic aberration tends to cause focus deviation; whereas a lens element provided in a stationary lens group causes a constant focus deviation irrespective of the focal length, a lens element provided in a movable lens group causes varying amounts of focus deviation, though in the same direction, with varying focal lengths. Thus, by arranging in a movable lens group a positive lens element made of a material having a large positive value of dN/dT, it is possible to reduce variation in focus deviation, and therefore with a proper arrangement, it is possible to correct the focus deviation down to a practically insignificant level.

The amount of focus deviation depends on the optical power of the lens element (an optical power being a quantity defined as the reciprocal of a focal length), the width of the beam, and the value of dN/dT, and does not depend on the zoom type. Wherever there is a lens element that causes focus deviation, focus deviation occurs in any type of lens system, and if that lens element is provided in a movable lens group, variation in focus deviation necessarily occurs. Although all the examples presented later deal with negative-led zoom lens systems, the effect of the present invention can be obtained in any zoom lens systems including positive-led ones.

By providing a negative lens element (corresponding to the lens elements G11 and G13 in Examples 1 and 2) made of a glass that fulfills conditional formulae (1) and (2), it is possible to correct the secondary spectrum of chromatic aberration satisfactorily. Over the upper limit of conditional formula (1) or (2), chromatic aberration is undercorrected. By providing a positive lens element (corresponding to the lens element G15 in Examples 1 and 2) made of a glass that fulfills conditional formulae (3), (4), and (5), and in addition moving it in the same direction as the above-mentioned negative lens element along the optical axis during zooming, it is possible to correct the focus deviation occurring in the negative lens element without increasing the secondary spectrum. Under the lower limit of conditional formula (3) or (4), chromatic aberration is large. Under the lower limit of conditional formula (5), the effect of correcting focus deviation is insufficient.

Figure 15:
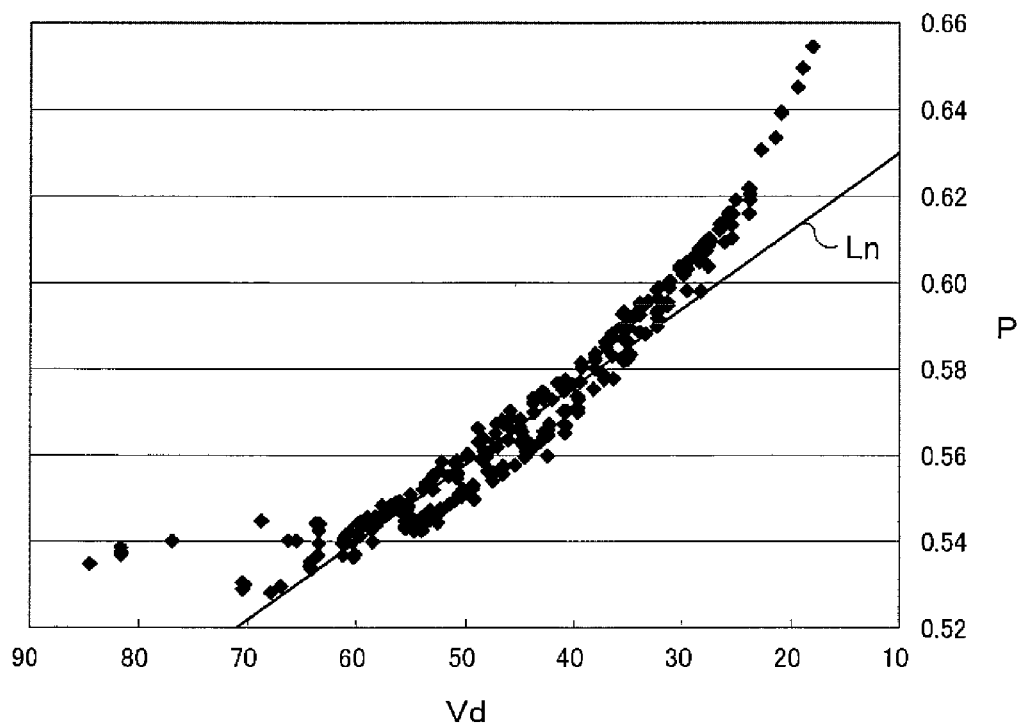
FIG. 15 is a graph showing a relationship between the Abbe number and the partial dispersion ratio of optical glasses.

FIG. 15 is a diagram showing a distribution of partial dispersion ratios in illustration of the relationship between the Abbe number Vd and the partial dispersion ratio P of optical glasses. The standard line Ln of anomalous dispersion is a straight line through the two points obtained by plotting the P and Vd of glass models C7 and F2 manufactured by HOYA (NSL7 and PBM2 manufactured by OHARA). A glass located farther away (in particular, upward) from the standard line Ln has higher anomalous dispersion. With glasses on the standard line Ln, $0.0018 \times Vd + P = 0.648$; with glasses above the standard line Ln, $0.648 < 0.0018 \times Vd + P$; and with glasses below the standard line Ln, $0.0018 \times Vd + P < 0.648$. Glasses having an especially high value of $0.0018 \times Vd + P$ (about 0.67 or more, though there is no definite border value) are referred to as anomalous dispersion glasses. Conditional formula (2) requires anomalous dispersion ranging from near-standard anomalous dispersion to anomalous dispersion opposite to that of so-called anomalous dispersion glasses, conditional formula (4) requires anomalous dispersion ranging from near-standard anomalous dispersion to somewhat high anomalous dispersion; and conditional formula (6), which will be introduced later, requires extremely high anomalous dispersion.

With a zoom lens system having the distinctive construction described above, it is possible to correct chromatic aberration satisfactorily, to reduce focus deviation accompanying variation in temperature, and in particular to reduce variation in the amount of focus deviation between different focal lengths. By employing such a zoom lens system in digital appliances such as digital cameras and projectors, it is possible to furnish the digital appliances additionally with high-performance image input and output capabilities while keeping them lightweight and compact. This contributes to making digital appliances compact, low-cost, high-performance, versatile, and otherwise better. The conditions etc. for striking a good balance among those benefits, and for achieving higher optical performance, further compactness, etc., will now be discussed.

It is preferable that a stationary lens group be provided to the reduction side of the above-mentioned movable lens groups, and that the stationary lens group include at least one positive lens element made of a material that fulfills conditional formulae (3) and (6) below:

$$60 < Vd \tag{3}$$

$$0.67 < 0.0018 \times Vd + P \tag{6}$$

By providing a positive lens element (corresponding to the lens elements G18, G19, G21, and G22 in Examples 1 and 2) made of an anomalous low-dispersion glass that fulfills conditional formulae (3) and (6), it is possible to correct the secondary spectrum of chromatic aberration satisfactorily. Under the lower limit of conditional formula (3) or (6), chromatic aberration may be undercorrected.

It is preferable that the at least one positive lens element made of a material that fulfills conditional formulae (3) to (5) fulfill conditional formula (7) below at all zoom positions:

$$0.85 < |Fx/Fx\text{max}| \tag{7}$$

where

Fx represents the distance from the optical axis to the ray passing closest to the edge through either the enlargement-side or the reduction-side lens surface thereof, with respect to the axial beam passing through the individual lens elements constituting the zoom lens system; and Fxmax represents the maximum value of the distances (Fx) from the optical axis to the ray passing closest to the edge through either the enlargement-side or the reduction-side lens surface thereof, with respect to the axial beam passing through the individual lens elements constituting the zoom lens system.

A lens element is more effective in correcting focus deviation the larger the diameter of the beam passing through it. Accordingly, by arranging a positive lens element (corresponding to the lens element G15 in Examples 1 and 2) fulfilling conditional formulae (3), (4), and (5) at a position where the beam has a large diameter as fulfills conditional formula (7) above, it is possible to correct focus deviation more effectively. If there is, within the zooming stroke, a position at which conditional formula (7) is not fulfilled, at that position, the effect of correcting focus deviation is insufficient, leading to degraded image quality.

It is preferable that conditional formula (7a) below be fulfilled, and it is further preferable that conditional formula (7b) below be fulfilled:

$$0.9 < |Fx/Fx\text{max}| \tag{7a}$$

$$0.95 < |Fx/Fx\text{max}| \tag{7b}$$

These conditional formulae (7a) and (7b) define, within the conditional range defined by conditional formula (7) above, conditional ranges that should further preferably be fulfilled out of the above-mentioned and other considerations. Accordingly, by fulfilling preferably conditional formula (7a), and more preferably conditional formula (7b), it is possible to obtain more of the benefits mentioned above.

It is preferable that the at least one positive lens element made of a material that fulfills conditional formulae (3) to (5) be located in the most reduction-side one of the plurality of movable lens groups. With this construction, it is possible to correct the focus deviation occurring in the movable lens groups and simultaneously correct as much as possible the focus deviation occurring in the stationary lens group; thus, it is possible to correct focus deviation with a good balance at all focal lengths. For example, whereas a movable lens group far away from a stationary lens group can only reduce variation in focus deviation between different focal lengths, and a stationary lens group can only correct focus deviation uniformly and cannot reduce variation between different focal lengths, a movable lens group close to a stationary lens group can do both.

It is preferable that the material that fulfills conditional formulae (3) to (5) have, with a thickness of 10 mm, a transmittance of 80% or more to light having a wavelength of 350 nm. With this construction, it is possible to obtain a practically satisfactory transmittance (99.9% in the examples presented later), and to keep a good color balance.

It is preferable that the material that fulfills conditional formulae (3) to (5) be quartz glass. With quartz glass, which has standard anomalous dispersion, it is possible to correct focus deviation satisfactorily without increasing chromatic aberration. In the graph in FIG. 15, quartz glass is plotted at an Abbe number Vd=67.72 and a partial dispersion ratio P=0.524; it thus exhibits standard anomalous dispersion and does not increase chromatic aberration. Quartz glass also has a sufficiently high transmittance of 99.9% (with a thickness of 10 mm) at a wavelength of 350 nm, and can keep a good color balance. Moreover, with quartz glass, which has a high rate dN/dT, specifically $9.9 \times 10^{-6}$, of variation in refractive index accompanying variation in temperature, it is possible to correct the focus deviation occurring in the positive lens element, and to prevent degradation in image quality.

Zoom lens systems according to the invention are suitable as imaging lens systems in digital appliances furnished with an image input capabilities, and can be combined with an image sensor or the like to build imaging optical devices which take in an image of a subject optically and output it in the form of an electrical signal. An imaging optical device is an optical device that constitutes a main component of cameras that are used to take still and moving images of subjects, and is composed of, for example, in order from the object side (that is, from the subject side), a zoom lens system which forms an optical image of an object and an image sensor which converts the optical image formed by the zoom lens system into an electrical signal. By arranging a zoom lens system having the distinctive construction described above in such a way that an optical image of a subject is formed on the sensing surface (that is, imaging surface) of an image sensor, it is possible to realize a compact, low-cost, high-zoom-ratio, high-performance imaging optical device and a digital appliance incorporating it.

Examples of digital appliances furnished with an image input capability include cameras such as cinematographic cameras, digital cameras, video cameras, surveillance cameras, vehicle-mounted cameras, and videophone cameras; and cameras incorporated in, or externally attached to, personal computers, digital devices (for example, compact, portable information device terminals such as cellular phones and mobile computers), peripheral devices for those (such as scanners and printers), and other digital devices. As will be understood from these examples, not only can an imaging optical device be used to build cameras, but an imaging optical device can also be incorporated in various devices to add camera capabilities to them. For example, it is possible to build digital appliances furnished with an image input capability such as camera-equipped projectors.

Figure 16A:
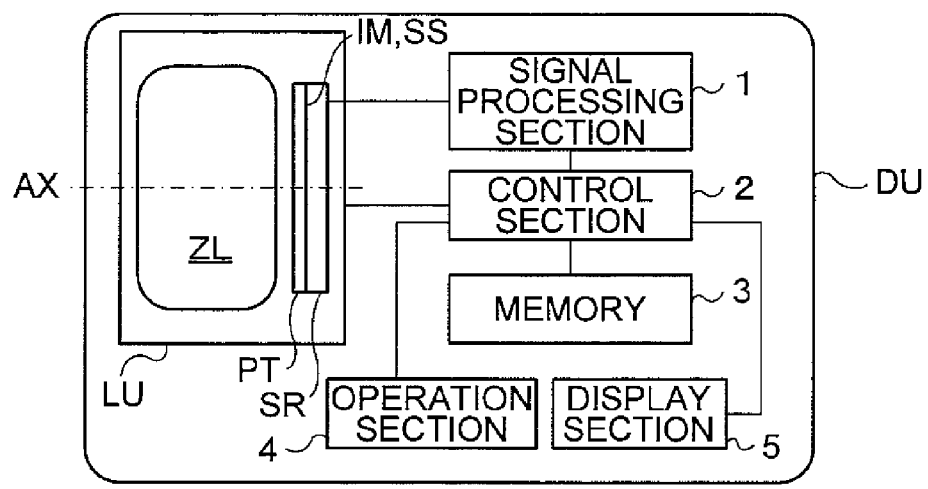
FIGS. 16A and 16B are each a schematic diagram showing an example of an outline configuration of a digital appliance incorporating a zoom lens system.

FIG. 16A shows, in a schematic sectional view, an example of an outline configuration of a digital appliance DU furnished with an image input capability. The digital appliance DU shown in FIG. 16A incorporates an imaging optical device LU, which includes, in order from the object side (that is, the subject side), a zoom lens system ZL (with AX representing the optical axis) which forms an optical image (image surface) IM of an object at variable magnification; a parallel-plane plate PT (corresponding to the cover glass of an image sensor SR and optical filters arranged as necessary, such as an optical low-pass filter and an infrared cut filter); and an image sensor SR which converts the optical image IM formed on its sensing surface SS by the zoom lens system ZL into an electrical signal. When this imaging optical device LU is used to build a digital appliance DU furnished with an image input capability, the former is typically housed inside the body of the latter; to realize camera capabilities, any suitable manner of implementation may be adopted. For example, an imaging optical device LU built as a unit may be designed to be removable from, or rotatable relative to, the body of a digital appliance DU.

The zoom lens system ZL achieves magnification variation (that is, zooming) by moving a plurality of zooming movable lens groups individually along the optical axis AX such that the group-to-group interval or intervals between them vary. The zoom lens system ZL achieves focusing (inner focusing) by moving two focusing lens groups within the most object-side (enlargement-side) zooming lens group individually along the optical axis AX. The zoom lens system ZL forms the optical image IM on the sensing surface SS of the image sensor SR. Used as the image sensor SR is, for example, a solid-state image sensor, such as a CCD (charge-coupled device) image sensor or a CMOS (complementary metal-oxide semiconductor) image sensor, that has a plurality of pixels. The zoom lens system ZL is arranged such that the optical image IM of the subject is formed on the sensing surface SS, which is the photoelectric conversion portion of the image sensor SR, and thus the optical image IM formed by the zoom lens system ZL is converted into an electrical signal by the image sensor SR.

The digital appliance DU includes, in addition to the imaging optical device LU, a signal processing section 1, a control section 2, a memory 3, an operation section 4, a display section 5, etc. The signal generated by the image sensor SR is subjected to predetermined digital image processing, image compression, etc. as necessary in the signal processing section 1, and the resulting digital video signal is recorded on the memory 3 (a semiconductor memory, an optical disc, or the like) and, as the case may be, transmitted to an external device via a cable or after being converted into an infrared signal or the like (for example, the communication capabilities of a cellular phone). The control section 2 includes a microcomputer, and governs, in a concentrated fashion, the control of functions such as image shooting functions (such as still image shooting and moving image shooting functions) and image playback functions; the control of lens movement mechanisms for zooming, focusing, image stabilization, etc.; and other control. For example, the control section 2 controls the imaging optical device LU to perform at least one of the shooting of a still image of the subject and the shooting of a moving image of the subject. The display section 5 includes a display device such as a liquid crystal monitor, and displays an image based on the image signal resulting from the conversion by the image sensor SR or based on image information recorded on the memory 3. The operation section 4 includes operated members such as operation buttons (for example, a shutter release button), an operation dial (for example, a shooting mode dial), etc., and conveys the information that the user enters by operating those to the control section 2.

Figure 1B:
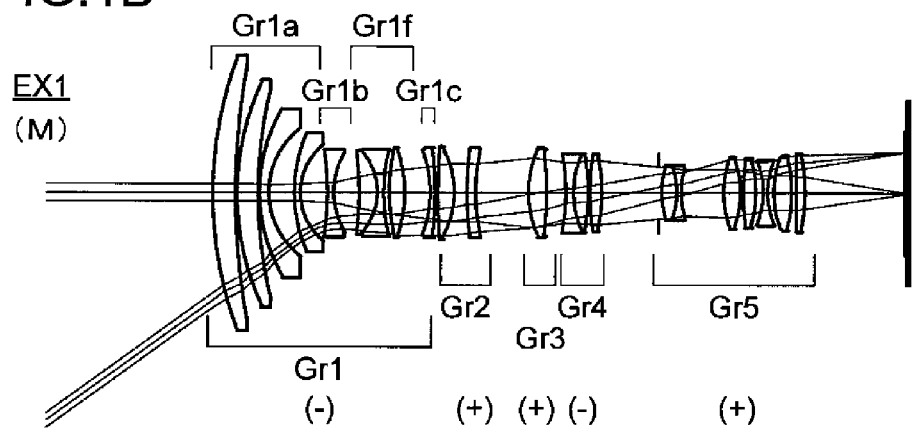
Figure 1C:
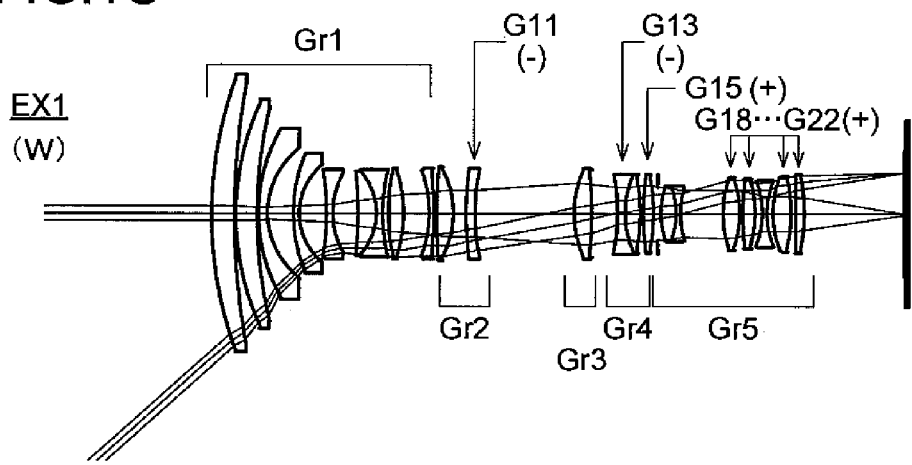
Figure 2A:
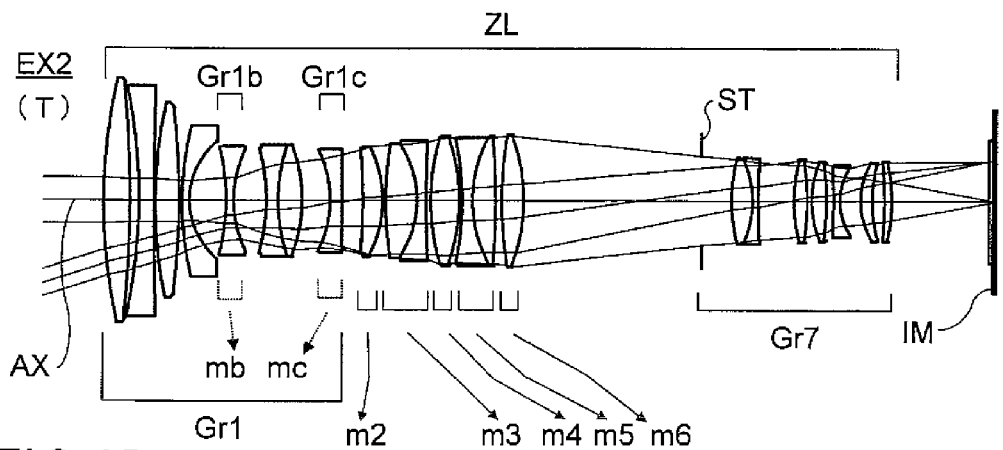
FIGS. 2A to 2C are optical path diagrams of the second embodiment (Example 2)
Figure 2B:
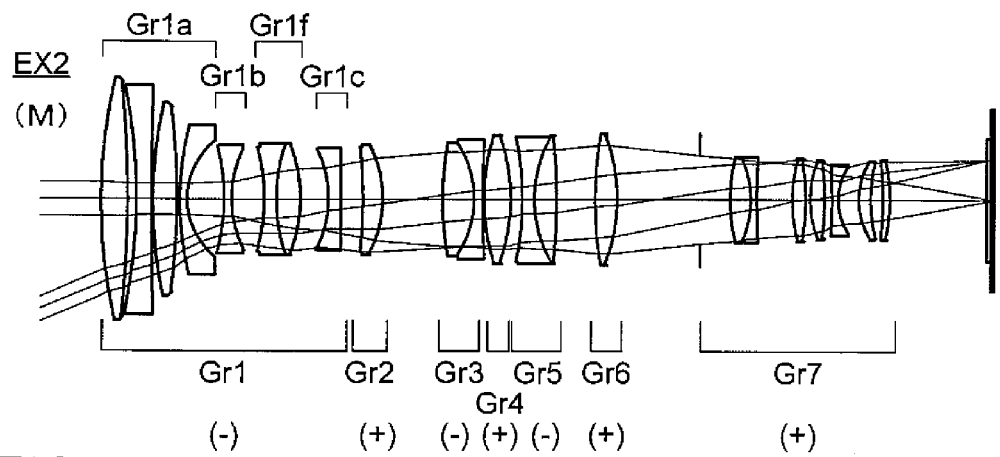
Figure 2C:
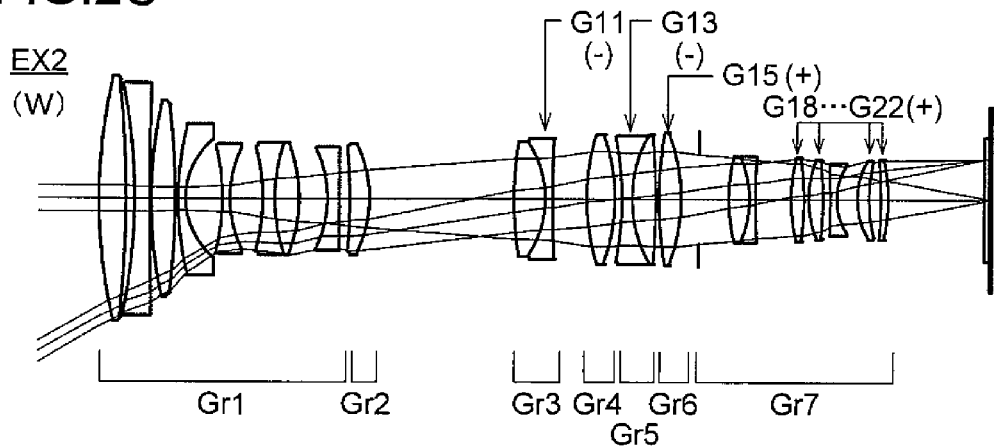

Now, by way of a first and a second embodiment, specific optical constructions of the zoom lens system ZL will be described in more detail. FIGS. 1A to 1C and FIGS. 2A to 2C are optical path diagrams of the zoom lens system ZL in the first and second embodiments respectively, FIGS. 1A and 2A showing, in an optical section, the lens arrangement, optical path, etc. at the telephoto end (T), FIGS. 1B and 2B showing those at the middle position (M, the middle-focal-length condition), and FIGS. 1C and 2C showing those at the wide-angle end (W). In FIGS. 1A and 2A, an arrow mi (where i=2, 3, . . . ) schematically indicates the movement of the i-th lens group Gri for zooming from the telephoto end (T) to the wide-angle end (W), and arrows mb and mc schematically indicate the movement of the 1b-th and 1c-th lens groups Gr1b and Gr1c, respectively, for focusing from the infinite object distance to the closest object distance. A j-th lens element Gj is, of all the constituent lens elements, the j-th one as counted from the enlargement side.

In both the first and second embodiments (FIGS. 1 and 2), the zoom lens system ZL is so constructed as to achieve zooming by, while keeping as stationary lens groups the most enlargement-side (object-side) zooming lens group and the most reduction-side (image-side) zooming lens group (with an aperture stop ST located at the enlargement-side end in the last lens group), moving as movable lens groups the other zooming lens groups along the optical axis AX. For example, in the first embodiment (FIGS. 1A to 1C), the zoom lens system ZL has a five-group construction with a negative, a positive, a positive, a negative, and a positive optical power in order from the enlargement-side, wherein the first and fifth lens groups Gr1 and Gr5 are stationary lens groups, and the second to fourth lens groups Gr2 to Gr4 are movable lens groups. In the second embodiment (FIGS. 2A to 2C), the zoom lens system ZL has a seven-group construction with a negative, a positive, a negative, a positive, a negative, a positive, and a positive optical power in order from the enlargement-side, wherein the first and seventh lens groups Gr1 and Gr7 are stationary lens groups, and the second to sixth lens groups Gr2 to Gr6 are movable lens groups.

The first lens group Gr1, which remains stationary during zooming and which has a negative optical power, is composed of four lens groups, specifically, in order from the enlargement-side, a 1a-th lens group Gr1a, a 1b-th lens group Gr1b, a 1f-th lens group Gr1f, and a 1c-th lens group Gr1c. Of these four lens groups, the 1a-th, 1b-th, and 1c-th lens groups Gr1a, Gr1b, and Gr1c have negative optical powers, and the 1a-th and 1f-th lens groups Gr1a and Gr1f remain stationary during focusing. The 1a-th lens group Gr1a includes at least one positive lens element, the 1b-th lens group Gr1b moves toward the reduction side during focusing from infinity to a close distance, and the 1c-th lens group Gr1c moves toward the enlargement side during focusing from infinity to a close distance.

Figure 16B:
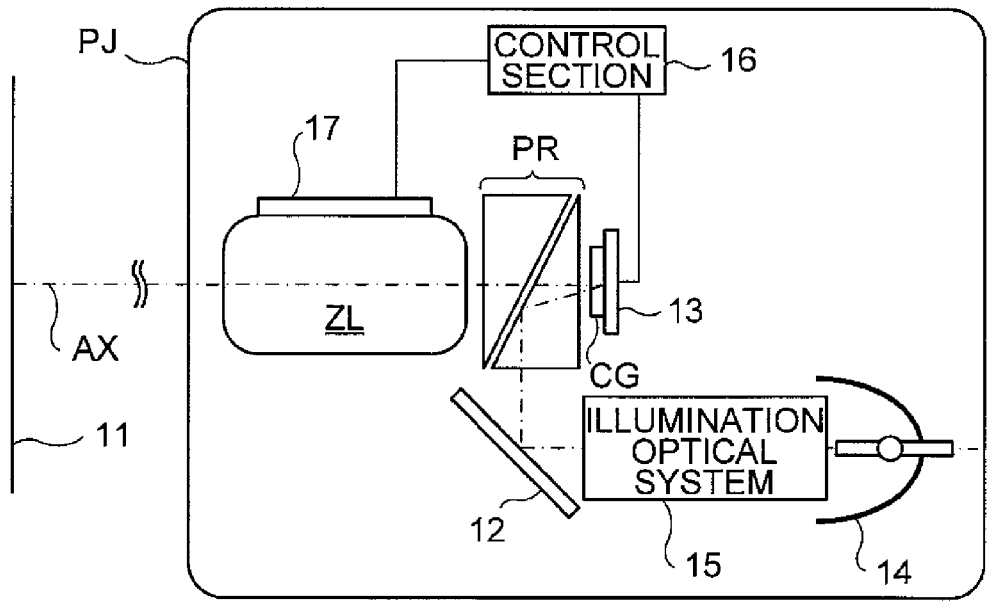

Next, a projector embodying the invention to which the zoom lens system ZL is applied will be described. FIG. 16B shows an example of an outline configuration of a projector PJ. The projector PJ includes the zoom lens system ZL, a reflection mirror 12, an image display device 13, a light source 14, an illumination optical system 15, a control section 16, a prism PR, etc. The control section 16 governs the overall control of the projector PJ. The image display device 13 is an image modulation device which modulates light to generate an image, and has cover glass CG fitted on its display surface where it displays an image. The light from the light source 14 is directed through the illumination optical system 15, via the reflection mirror 12 and the prism PR, to the image display device 13. The prism PR is, for example, a TIR (total internal reflection) prism (or a color splitting/integrating prism, or the like), and separates between illumination and projection light. The image displayed on the image display device 13 is projected onto a screen surface 11 through the zoom lens system ZL on an enlarged scale.

Each lens group that is moved for zooming or focusing is fitted with an actuator 17 by which it is moved toward the enlargement side or toward the reduction side along the optical axis AX. Each actuator 17 is connected to the control section 16 for the control of the movement of movable lens groups. The control section 16 and the actuator 17 may be omitted; that is, lens groups may instead be moved manually.

According to the construction of the zoom lens system ZL incorporated in the digital appliance DU mentioned previously and in the projector PJ here, owing to the negative and positive lens elements made of materials fulfilling predetermined conductions being provided in a movable lens group, it is possible to correct chromatic aberration satisfactorily, to suppress focus deviation accompanying variation in temperature, and in particular to reduce variation in focus deviation accompanying variation in temperature between different focal lengths.

EXAMPLES

The construction etc. of zoom lens systems embodying the invention will now be described more specifically, with reference to the construction data etc. of practical examples. Examples 1 and 2 (EX1, EX2) presented below are numerical examples corresponding to the above-described first and second embodiments respectively, and the optical path diagrams (FIGS. 1A to 1C and 2A to 2C) of the first and second embodiments also show the lens arrangement, optical path, etc. of the corresponding ones of Examples 1 and 2 respectively.

The construction data of each example includes the following. Listed as surface data are, from the leftmost column rightward, surface number i, radius of curvature r (mm), axial distance d (mm), refractive index Nd for the d-line (with a wavelength of 587.6 nm), and Abbe number Vd for the d-line. Listed as miscellaneous data are zoom ratio and, for each of the different focal length conditions (T), (M), and (W), focal length (FL, mm) of the entire system, f-number (FNO), image height (Y', mm), lens total length (TL, mm), back focal length (BF, mm), magnification when focusing on the closest object distance (near-end magnification), half view angle when focusing on the infinite object distance (infinity ω, °), half view angle when focusing on the closest object distance (near-end ω, °), view angle variation (%); also listed are variable axial distances di (i representing the surface number, mm), that is, axial distances that vary during zooming and focusing. Listed as zooming lens group data are the focal length (mm) of those lens groups. In both examples, the variation in view angle from infinity to the close-up distance is successfully suppressed to about 2%.

The back focal length BF is given as an air equivalent length from the last lens surface to the paraxial image surface IM, and the lens total length TL is the sum of the distance from the foremost lens surface to the last lens surface and the back focal length. The symbols (T, ∞), (M, ∞), and (W, ∞) indicate variable axial distances di in the different focal length conditions (T), (M), and (W) when focusing on the infinite object distance, and the symbols (T, N), (M, N), and (W, N) indicate variable axial distances di in the different focal length conditions (T), (M), and (W) when focusing on the closest object distance.

Tables 1 to 4 list data related to the conditional formulae in each example, and Table 5 lists the values corresponding to the conditional formulae in each example. In Tables 1 to 4, the values of anomaly related to conditional formulae (2), (4), and (6) are given in terms of 0.0018×Vd+P, and the values of dN/dT related to conditional formula (5) are given in terms of ×10$^{-6}$ (E−6). The values of Fx related to conditional formula (7) are given with respect to whichever of the enlargement-side and reduction-side lens surfaces through which the ray passes closest to the edge, and the values of Fx/Fxmax are listed in the rows between those for the enlargement-side and reduction-side lens surfaces.

Table 6 lists the amounts of focus deviation (mm, accompanying variation in temperature from 20° C. to 50° C.) at different focal lengths (mm) and their variation (mm) for each of Example 1 and 2, where quartz is used as the material for the temperature compensation lens element (G15), and Controls (control examples) 1 and 2, where dummy glass is used as the material for the temperature compensation lens element (G15). The dummy glass is an imaginary glass material that has the same refractive index Nd and Abbe number Vd as quartz but gives zero as the value of conditional formula (5); Examples 1 and 2 have the same constructions as Controls 1 and 2 respectively except that the temperature compensation lens element (G15) is made of different materials.

FIGS. 3A-3D, 4A-4D, 5A-5D, 6A-6D, 7A-7D, and 8A-8D and FIGS. 9A-9D, 10A-10D, 11A-11D, 12A-12D, 13A-13D, and 14A-14D are aberration diagrams of Examples 1 and 2 (EX1 and EX2) respectively. FIGS. 3A-3D, 4A-4D, 9A-9D, and 10A-10D show aberrations at the telephoto end (T), FIGS. 5A-5D, 6A-6D, 11A-11D, and 12A-12D show aberrations at the middle position (M), and FIGS. 7A-7D, 8A-8D, 13A-13D, and 14A-14D show aberrations at the wide-angle end (W). FIGS. 3A-3D, 5A-5D, 7A-7D, 9A-9D, 11A-11D, and 13A-13D show aberrations when focusing on the infinite object distance (infinity position, ∞), and FIGS. 4A-4D, 6A-6D, 8A-8D, 10A-10D, 12A-12D, and 14A-14D show aberrations when focusing on the closest object distance (near-end position, N).

Of all these aberration diagrams, those suffixed with A show spherical aberration (mm), those suffixed with B show astigmatism (mm), those suffixed with C show distortion (%), and those suffixed with D show lateral chromatic aberration (H representing the height of incidence (mm), and Y' representing the image height (mm)). In the spherical aberration diagrams suffixed with A, the solid line SA-e represents the spherical aberration for the e-line (with a wavelength of 546.1 nm), the broken line SA-g represents the spherical aberration for the g-line (with a wavelength of 435.8 nm), and the dash-and-dot line SA-C represents the spherical aberration for the C-line (with a wavelength of 656.3 nm). In the astigmatism diagrams suffixed with B, the bold lines mer-e, mer-g, and mer-C represent the meridional surface, and the fine lines sag-e, sag-g, and sag-C represent the sagittal surface, the solid lines mer-e and sag-e representing the astigmatism for the e-line (with a wavelength of 546.1 nm), the broken lines mer-g and sag-g representing the astigmatism for the g-line (with a wavelength of 435.8 nm), and the dash-and-dot lines mer-C and sag-C representing the astigmatism for the C-line (with a wavelength of 656.3 nm). In the astigmatism diagrams suffixed with C, the solid line represents the distortion (%) for the e-line. In the lateral chromatic aberration diagram suffixed with D, the broken line represents the lateral chromatic aberration for the g-line (with a wavelength of 435.8 nm), and the dash-and-dot line represents the lateral chromatic aberration for the C-line (with a wavelength of 656.3 nm).

Example 1

| | | Unit: mm | | |
|---|---|---|---|---|
| | | Surface Data | | |
| i | r | d | Nd | Vd |
| 1 | 166.067 | | | |
| | | 8.632 | 1.69680 | 55.5 |
| 2 | 301.160 | | | |
| | | 0.500 | | |
| 3 | 112.627 | | | |
| | | 8.511 | 1.71300 | 53.9 |
| 4 | 191.882 | | | |
| | | 0.500 | | |
| 5 | 70.555 | | | |
| | | 3.387 | 1.72916 | 54.7 |
| 6 | 34.168 | | | |
| | | 9.893 | | |
| 7 | 62.893 | | | |
| | | 2.371 | 1.72916 | 54.7 |
| 8 | 26.769 | | | |
| | Variable (Focus) | | | |
| 9 | −113.546 | | | |
| | | 1.393 | 1.80518 | 25.5 |
| 10 | 32.822 | | | |
| | Variable (Focus) | | | |
| 11 | −134.227 | | | |
| | | 7.178 | 1.59270 | 35.5 |
| 12 | −26.596 | | | |
| | | 0.010 | | |
| 13 | −26.596 | | | |
| | | 1.676 | 1.48749 | 70.4 |
| 14 | 77.321 | | | |
| | | 2.448 | | |

-continued

| Unit: mm | | | | |
|---|---|---|---|---|
| 15 | 93.911 | | | |
| | | 6.396 | 1.59270 | 35.5 |
| 16 | −58.472 | | | |
| | | Variable (Focus) | | |
| 17 | −48.591 | | | |
| | | 1.692 | 1.65412 | 39.7 |
| 18 | −196.645 | | | |
| | | Variable (Focus & Zoom) | | |
| 19 | 297.717 | | | |
| | | 7.272 | 1.48749 | 70.4 |
| 20 | −38.451 | | | |
| | | 3.983 | | |
| 21 | 133.494 | | | |
| | | 3.558 | 1.88300 | 40.8 |
| 22 | 84.814 | | | |
| | | Variable (Zoom) | | |
| 23 | 43.901 | | | |
| | | 8.081 | 1.54814 | 45.8 |
| 24 | −158.261 | | | |
| | | Variable (Zoom) | | |
| 25 | −93.075 | | | |
| | | 2.343 | 1.88300 | 40.8 |
| 26 | 40.177 | | | |
| | | 0.010 | | |
| 27 | 40.177 | | | |
| | | 6.403 | 1.48749 | 70.4 |
| 28 | −88.944 | | | |
| | | 0.500 | | |
| 29 | 105.024 | | | |
| | | 4.726 | 1.45847 | 67.7 |
| 30 | −77.381 | | | |
| | | Variable (Zoom) | | |
| 31 (Aperture) | ∞ | | | |
| | | 1.450 | | |
| 32 | 37.279 | | | |
| | | 6.540 | 1.59270 | 35.5 |
| 33 | −33.425 | | | |
| | | 0.010 | | |
| 34 | −33.425 | | | |
| | | 0.839 | 1.83481 | 42.7 |
| 35 | 42.507 | | | |
| | | 16.896 | | |
| 36 | 45.752 | | | |
| | | 6.869 | 1.49700 | 81.6 |
| 37 | −43.520 | | | |
| | | 0.500 | | |
| 38 | 118.174 | | | |
| | | 5.360 | 1.49700 | 81.6 |
| 39 | −53.071 | | | |
| | | 2.917 | | |
| 40 | −38.455 | | | |
| | | 1.024 | 1.88300 | 40.8 |
| 41 | 34.631 | | | |
| | | 2.815 | | |
| 42 | 42.958 | | | |
| | | 7.497 | 1.49700 | 81.6 |
| 43 | −62.483 | | | |
| | | 1.000 | | |
| 44 | 828.643 | | | |
| | | 4.132 | 1.49700 | 81.6 |
| 45 | −75.958 | | | |
| | | 38.000 | | |
| 46 | ∞ | | | |
| | | 1.000 | 1.51680 | 64.2 |
| 47 | ∞ | | | |
| | | 1.000 | | |
| 48 | ∞ | | | |

| Miscellaneous Data | | | |
|---|---|---|---|
| Zoom Ratio | 1.61 | | |
| | (T) | (M) | (W) |
| FL | 29.0 | 22.5 | 18.0 |
| FNO | 3.15 | 3.15 | 3.15 |
| Y' | 16.8 | 16.8 | 16.8 |
| TL | 271.2 | 271.2 | 271.2 |

-continued

| Unit: mm | | | | | | |
|---|---|---|---|---|---|---|
| BF | 39.7 | | 39.7 | | 39.7 | |
| Near-End Magnification | −0.0914 | | −0.0733 | | −0.0588 | |
| Infinity ω (°) | 31.0 | | 36.8 | | 43.0 | |
| Near-End ω (°) | 30.7 | | 36.4 | | 42.2 | |
| View Angle Variation (%) | −0.81 | | −1.08 | | −1.86 | |
| | (T, ∞) | (M, ∞) | (W, ∞) | (T, N) | (M, N) | (W, N) |
| d8 | 11.642 | 11.642 | 11.642 | 14.515 | 14.515 | 14.515 |
| d10 | 10.761 | 10.761 | 10.761 | 7.888 | 7.888 | 7.888 |
| d16 | 9.995 | 9.995 | 9.995 | 5.261 | 5.261 | 5.261 |
| d18 | 1.666 | 0.440 | 0.586 | 6.400 | 5.174 | 5.320 |
| d22 | 0.500 | 20.335 | 38.408 | 0.500 | 20.335 | 38.408 |
| d24 | 5.292 | 7.328 | 9.866 | 5.292 | 7.328 | 9.866 |
| d30 | 42.392 | 21.748 | 0.991 | 42.392 | 21.748 | 0.991 |

Zooming Lens Group Data

| Group | Start Surface | Focal Length |
|---|---|---|
| 1 | 1 | −16.876 |
| 2 | 19 | 90.121 |
| 3 | 23 | 63.265 |
| 4 | 25 | −498.206 |
| 5 | 31 | 98.491 |

Example 2

| Unit: mm | | | | |
|---|---|---|---|---|
| Surface Data | | | | |
| i | r | d | Nd | Vd |
| 1 | 232.913 | | | |
| | | 11.380 | 1.72916 | 54.7 |
| 2 | −489.850 | | | |
| | | 3.200 | | |
| 3 | −238.540 | | | |
| | | 5.623 | 1.59270 | 35.3 |
| 4 | 1555.364 | | | |
| | | 0.500 | | |
| 5 | 196.039 | | | |
| | | 9.989 | 1.48749 | 70.2 |
| 6 | −332.424 | | | |
| | | 0.500 | | |
| 7 | 132.022 | | | |
| | | 3.039 | 1.60300 | 65.4 |
| 8 | 32.308 | | | |
| | | Variable (Focus) | | |
| 9 | −89.867 | | | |
| | | 2.188 | 1.75700 | 47.8 |
| 10 | 48.827 | | | |
| | | Variable (Focus) | | |
| 11 | −87.815 | | | |
| | | 4.211 | 1.51633 | 64.1 |
| 12 | 75.048 | | | |
| | | 0.010 | | |
| 13 | 75.048 | | | |
| | | 10.000 | 1.83481 | 42.7 |
| 14 | −66.499 | | | |
| | | Variable (Focus) | | |
| 15 | −48.310 | | | |
| | | 4.102 | 1.51633 | 64.1 |
| 16 | 22216.872 | | | |
| | | Variable (Focus & Zoom) | | |
| 17 | −229.144 | | | |
| | | 7.547 | 1.48749 | 70.2 |
| 18 | −52.104 | | | |
| | | Variable (Zoom) | | |
| 19 | 154.427 | | | |
| | | 12.826 | 1.62041 | 60.3 |
| 20 | −43.677 | | | |

-continued

| \multicolumn{5}{c|}{Unit: mm} |
|---|---|---|---|---|
| | | 0.010 | | |
| 21 | −43.677 | | | |
| | | 2.789 | 1.88300 | 40.8 |
| 22 | 508.663 | | | |
| | | Variable (Zoom) | | |
| 23 | 94.235 | | | |
| | | 11.528 | 1.59270 | 35.3 |
| 24 | −82.541 | | | |
| | | Variable (Zoom) | | |
| 25 | −129.135 | | | |
| | | 3.802 | 1.88300 | 40.8 |
| 26 | 55.274 | | | |
| | | 0.010 | | |
| 27 | 55.274 | | | |
| | | 9.918 | 1.62041 | 60.3 |
| 28 | −291.945 | | | |
| | | Variable (Zoom) | | |
| 29 | 165.719 | | | |
| | | 9.394 | 1.45847 | 67.7 |
| 30 | −78.365 | | | |
| | | Variable (Zoom) | | |
| 31 (Aperture) | ∞ | | | |
| | | 11.827 | | |
| 32 | 76.438 | | | |
| | | 8.529 | 1.59270 | 35.3 |
| 33 | −43.225 | | | |
| | | 0.010 | | |
| 34 | −43.225 | | | |
| | | 2.051 | 1.88300 | 40.8 |
| 35 | 334.850 | | | |
| | | 13.683 | | |
| 36 | 67.342 | | | |
| | | 6.036 | 1.49700 | 81.5 |
| 37 | −109.202 | | | |
| | | 1.056 | | |
| 38 | 43.363 | | | |
| | | 6.935 | 1.49700 | 81.5 |
| 39 | −135.874 | | | |
| | | 2.515 | | |
| 40 | −245.042 | | | |
| | | 1.805 | 1.88300 | 40.8 |
| 41 | 26.368 | | | |
| | | 8.339 | | |
| 42 | 32.941 | | | |
| | | 4.642 | 1.49700 | 81.5 |
| 43 | 66.609 | | | |
| | | 5.264 | | |
| 44 | −166.832 | | | |
| | | 3.237 | 1.49700 | 81.5 |
| 45 | −73.012 | | | |
| | | 38.000 | | |
| 46 | ∞ | | | |
| | | 2.000 | 1.51633 | 64.1 |
| 47 | ∞ | | | |
| | | 1.000 | | |
| 48 | ∞ | | | |

| \multicolumn{4}{c}{Miscellaneous Data} |
|---|---|---|---|
| Zoom Ratio | 1.77 | | |
| | (T) | (M) | (W) |
| FL | 49.5 | 37.2 | 28.0 |
| FNO | 2.70 | 2.70 | 2.70 |
| Y' | 16.8 | 16.8 | 16.8 |
| TL | 353.3 | 353.3 | 353.3 |
| BF | 40.3 | 40.3 | 40.3 |
| Near-End Magnification | −0.0861 | −0.0648 | −0.0487 |
| Infinity ω (°) | 18.7 | 24.4 | 31.2 |
| Near-End ω (°) | 18.6 | 24.4 | 31.1 |
| View Angle Variation (%) | −0.36 | −0.23 | −0.37 |

| | (T, ∞) | (M, ∞) | (W, ∞) | (T, N) | (M, N) | (W, N) |
|---|---|---|---|---|---|---|
| d8 | 15.368 | 15.368 | 15.368 | 17.757 | 17.757 | 17.757 |
| d10 | 13.570 | 13.570 | 13.570 | 11.181 | 11.181 | 11.181 |
| d14 | 10.909 | 10.909 | 10.909 | 6.223 | 6.223 | 6.223 |

-continued

| Unit: mm | | | | | | |
|---|---|---|---|---|---|---|
| d16 | 9.107 | 9.672 | 5.000 | 13.793 | 14.358 | 9.687 |
| d18 | 0.500 | 23.045 | 56.281 | 0.500 | 23.045 | 56.281 |
| d22 | 2.183 | 0.500 | 13.480 | 2.183 | 0.500 | 13.480 |
| d24 | 1.206 | 4.532 | 2.901 | 1.206 | 4.532 | 2.901 |
| d28 | 1.728 | 14.458 | 0.500 | 1.728 | 14.458 | 0.500 |
| d30 | 69.938 | 32.456 | 6.500 | 69.938 | 32.456 | 6.500 |

| Zooming Lens Group Data | | |
|---|---|---|
| Group | Start Surface | Focal Length |
| 1 | 1 | −31.396 |
| 2 | 17 | 135.953 |
| 3 | 19 | −282.245 |
| 4 | 23 | 75.571 |
| 5 | 25 | −106.051 |
| 6 | 29 | 117.051 |
| 7 | 31 | 200.591 |

TABLE 1

| Example 1 | | | | | | | | | | | | |
|---|---|---|---|---|---|---|---|---|---|---|---|---|
| | | dN/dT | | T | | M | | W | | | | |
| i | P | (E-6) | Anom. | Fx | Fx/Fxmax | Fx | Fx/Fxmax | Fx | Fx/Fxmax | | Element, Group, etc. | |
| 1 | | | | 4.44 | | 3.56 | | 2.86 | | | | Gr1 |
| | 0.54250 | 3.9 | 0.6423 | 4.44 | 0.29 | 3.56 | 0.26 | 2.86 | 0.23 | G1 | (Gr1a) | |
| 2 | | | | 4.35 | | 3.49 | | 2.80 | | | | |
| 3 | | | | 4.34 | | 3.48 | | 2.79 | | | | |
| | 0.54407 | 4.0 | 0.6412 | 4.34 | 0.28 | 3.48 | 0.25 | 2.79 | 0.23 | G2 | | |
| 4 | | | | 4.17 | | 3.34 | | 2.68 | | | | |
| 5 | | | | 4.15 | | 3.33 | | 2.67 | | | | |
| | 0.54529 | 3.4 | 0.6437 | 4.15 | 0.27 | 3.33 | 0.24 | 2.67 | 0.22 | G3 | | |
| 6 | | | | 4.02 | | 3.23 | | 2.59 | | | | |
| 7 | | | | 4.25 | | 3.41 | | 2.73 | | | | |
| | 0.54529 | 3.4 | 0.6437 | 4.25 | 0.28 | 3.41 | 0.25 | 2.73 | 0.22 | G4 | | |
| 8 | | | | 4.21 | | 3.38 | | 2.71 | | | | |
| 9 | | | | 5.23 | | 4.20 | | 3.37 | | | | Gr1 |
| | 0.61554 | 0.5 | 0.6614 | 5.37 | 0.35 | 4.30 | 0.31 | 3.44 | 0.28 | G5 | (Gr1b) | |
| 10 | | | | 5.37 | | 4.30 | | 3.44 | | | | |
| 11 | | | | 8.17 | | 6.53 | | 5.23 | | | | Gr1 |
| | 0.59258 | 0.8 | 0.6564 | 9.29 | 0.60 | 7.49 | 0.54 | 6.03 | 0.49 | G6 | (Gr1f) | |
| 12 | | | | 9.29 | | 7.49 | | 6.03 | | | | |
| 13 | | | | 9.29 | | 7.49 | | 6.03 | | | | |
| | 0.53043 | −1.4 | 0.6572 | 10.02 | 0.65 | 7.94 | 0.57 | 6.33 | 0.51 | G7 | | |
| 14 | | | | 10.02 | | 7.94 | | 6.33 | | | | |
| 15 | | | | 10.88 | | 8.61 | | 6.85 | | | | |
| | 0.59258 | 0.8 | 0.6564 | 11.64 | 0.75 | 9.29 | 0.67 | 7.43 | 0.60 | G8 | | |
| 16 | | | | 11.64 | | 9.29 | | 7.43 | | | | |
| 17 | | | | 12.99 | | 10.37 | | 8.30 | | | | (Gr1c) |
| | 0.57371 | 4.8 | 0.6451 | 13.58 | 0.88 | 10.76 | 0.77 | 8.57 | 0.69 | G9 | Gr1 | |
| 18 | | | | 13.58 | | 10.76 | | 8.57 | | | | |
| 19 | | | | 14.28 | | 10.96 | | 8.72 | | | | Gr2 |
| | 0.53043 | −1.4 | 0.6572 | 14.94 | 0.97 | 11.67 | 0.84 | 9.36 | 0.75 | G10 | | |
| 20 | | | | 14.94 | | 11.67 | | 9.36 | | | | |
| 21 | | | | 15.34 | | 11.96 | | 9.56 | | | | |
| | 0.56544 | 4.9 | 0.6389 | 15.34 | 0.99 | 11.96 | 0.86 | 9.56 | 0.77 | G11 | O.A. | |
| 22 | | | | 15.23 | | 11.89 | | 9.50 | | | | |
| 23 | | | | 15.45 | | 13.90 | | 12.41 | | | | Gr3 |
| | 0.56993 | 1.9 | 0.6524 | 15.45 | 1.00 | 13.90 | 1.00 | 12.41 | 1.00 | G12 | | |
| 24 | | | | 15.16 | | 13.59 | | 12.07 | | | | |

Abbreviations:
A.L.D. Anomalous Low-Dispersion
Anom. Anomaly
C.G. Cover Glass
O.A. Opposite Anomaly
Q.G. Quartz Glass

TABLE 2

Example 1

| i | P | dN/dT (E-6) | Anom. | T Fx | T Fx/Fxmax | M Fx | M Fx/Fxmax | W Fx | W Fx/Fxmax | Element, Group, etc. |
|---|---|---|---|---|---|---|---|---|---|---|
| 25 | | | | 14.41 | | 12.58 | | 10.78 | | Gr4 |
| | 0.56544 | 4.9 | 0.6389 | 14.41 | 0.93 | 12.58 | 0.91 | 10.78 | 0.87 | G13 O.A. |
| 26 | | | | 14.38 | | 12.54 | | 10.72 | | |
| 27 | | | | 14.38 | | 12.54 | | 10.72 | | |
| | 0.53043 | −1.4 | 0.6572 | 14.63 | 0.95 | 12.80 | 0.92 | 10.96 | 0.88 | G14 |
| 28 | | | | 14.63 | | 12.80 | | 10.96 | | |
| 29 | | | | 14.81 | | 12.90 | | 11.00 | | |
| | 0.52436 | 9.9 | 0.6463 | 14.81 | 0.96 | 12.90 | 0.93 | 11.00 | 0.89 | G15 Q.G. |
| 30 | | | | 14.81 | | 12.88 | | 10.94 | | |
| 31 | ST | | | 10.78 | | 10.78 | | 10.78 | | Gr5 |
| 32 | | | | 10.51 | | 10.51 | | 10.51 | | |
| | 0.59258 | 0.8 | 0.6564 | 10.51 | 0.68 | 10.51 | 0.76 | 10.51 | 0.85 | G16 |
| 33 | | | | 9.92 | | 9.92 | | 9.92 | | |
| 34 | | | | 9.92 | | 9.92 | | 9.92 | | |
| | 0.56532 | 4.8 | 0.6422 | 9.92 | 0.64 | 9.92 | 0.71 | 9.92 | 0.80 | G17 |
| 35 | | | | 9.58 | | 9.58 | | 9.58 | | |
| 36 | | | | 9.74 | | 9.74 | | 9.74 | | |
| | 0.53876 | −6.4 | 0.6857 | 9.74 | 0.63 | 9.74 | 0.70 | 9.74 | 0.78 | G18 A.L.D. |
| 37 | | | | 9.43 | | 9.43 | | 9.43 | | |
| 38 | | | | 9.02 | | 9.02 | | 9.02 | | |
| | 0.53876 | −6.4 | 0.6857 | 9.02 | 0.58 | 9.02 | 0.65 | 9.02 | 0.73 | G19 A.L.D. |
| 39 | | | | 8.27 | | 8.27 | | 8.27 | | |
| 40 | | | | 7.25 | | 7.25 | | 7.25 | | |
| | 0.56544 | 4.9 | 0.6389 | 7.25 | 0.47 | 7.25 | 0.52 | 7.25 | 0.58 | G20 |
| 41 | | | | 7.04 | | 7.04 | | 7.04 | | |
| 42 | | | | 7.12 | | 7.12 | | 7.12 | | |
| | 0.53876 | −6.4 | 0.6857 | 7.12 | 0.46 | 7.12 | 0.51 | 7.12 | 0.57 | G21 A.L.D. |
| 43 | | | | 6.88 | | 6.88 | | 6.88 | | |
| 44 | | | | 6.72 | | 6.72 | | 6.72 | | |
| | 0.53876 | −6.4 | 0.6857 | 6.72 | 0.43 | 6.72 | 0.48 | 6.72 | 0.54 | G22 A.L.D. |
| 45 | | | | 6.42 | | 6.42 | | 6.42 | | |
| 46 | | | | 0.27 | | 0.27 | | 0.27 | | |
| | 0.53416 | | | | | | | | | C.G. |
| 47 | | | | 0.16 | | 0.16 | | 0.16 | | |
| 48 | | | | 15.45 | | 13.90 | | 12.41 | | IM |

Abbreviations:
A.L.D. Anomalous Low-Dispersion
Anom. Anomaly
C.G. Cover Glass
O.A. Opposite Anomaly
Q.G. Quartz Glass

TABLE 3

Example 2

| i | P | dN/dT (E-6) | Anom. | T Fx | T Fx/Fxmax | M Fx | M Fx/Fxmax | W Fx | W Fx/Fxmax | Element, Group, etc. |
|---|---|---|---|---|---|---|---|---|---|---|
| 1 | | | | 9.17 | | 6.90 | | 5.18 | | Gr1 (Gr1a) |
| | 0.54445 | 4.1 | 0.6429 | 9.17 | 0.34 | 6.90 | 0.31 | 5.18 | 0.27 | G1 |
| 2 | | | | 8.98 | | 6.76 | | 5.08 | | |
| 3 | | | | 8.85 | | 6.66 | | 5.00 | | |
| | 0.59329 | 0.2 | 0.6568 | 8.85 | 0.33 | 6.66 | 0.30 | 5.00 | 0.26 | G2 |
| 4 | | | | 8.78 | | 6.60 | | 4.96 | | |
| 5 | | | | 8.77 | | 6.59 | | 4.96 | | |
| | 0.53001 | −0.7 | 0.6564 | 8.77 | 0.33 | 6.59 | 0.29 | 4.96 | 0.26 | G3 |
| 6 | | | | 8.51 | | 6.40 | | 4.81 | | |
| 7 | | | | 8.47 | | 6.38 | | 4.79 | | |
| | 0.54016 | −2.5 | 0.6580 | 8.47 | 0.32 | 6.38 | 0.28 | 4.79 | 0.25 | G4 |
| 8 | | | | 8.25 | | 6.23 | | 4.69 | | |
| 9 | | | | 9.22 | | 6.97 | | 5.25 | | Gr1 (Gr1b) |
| | 0.55656 | 5.1 | 0.6426 | 9.53 | 0.36 | 7.16 | 0.32 | 5.37 | 0.28 | G5 |
| 10 | | | | 9.53 | | 7.16 | | 5.37 | | |
| 11 | | | | 13.28 | | 10.05 | | 7.58 | | Gr1 (Gr1f) |
| | 0.53524 | 2.7 | 0.6507 | 15.06 | 0.56 | 11.13 | 0.50 | 8.29 | 0.43 | G6 |
| 12 | | | | 15.06 | | 11.13 | | 8.29 | | |

TABLE 3-continued

Example 2

| i | P | dN/dT (E-6) | Anom. | T Fx | T Fx/Fxmax | M Fx | M Fx/Fxmax | W Fx | W Fx/Fxmax | Element, Group, etc. | |
|---|---|---|---|---|---|---|---|---|---|---|---|
| 13 | | | | 15.07 | | 11.13 | | 8.29 | | | |
| | 0.56532 | 4.8 | 0.6422 | 16.20 | 0.61 | 12.17 | 0.54 | 9.15 | 0.47 | G7 | |
| 14 | | | | 16.20 | | 12.17 | | 9.15 | | | |
| 15 | | | | 17.28 | | 13.01 | | 9.79 | | | Gr1 |
| | 0.53524 | 2.7 | 0.6507 | 18.75 | 0.70 | 13.89 | 0.62 | 10.35 | 0.53 | G8 | (Gr1c) |
| 16 | | | | 18.75 | | 13.89 | | 10.35 | | | |
| 17 | | | | 21.31 | | 15.97 | | 11.15 | | | Gr2 |
| | 0.53001 | −0.7 | 0.6564 | 22.17 | 0.83 | 16.90 | 0.75 | 11.98 | 0.62 | G9 | |
| 18 | | | | 22.17 | | 16.90 | | 11.98 | | | |
| 19 | | | | 23.13 | | 19.52 | | 16.51 | | | Gr3 |
| | 0.54259 | 1.9 | 0.6511 | 23.23 | 0.87 | 19.59 | 0.87 | 16.57 | 0.85 | G10 | |
| 20 | | | | 23.23 | | 19.59 | | 16.57 | | | |
| 21 | | | | 23.23 | | 19.59 | | 16.57 | | | |
| | 0.56544 | 4.9 | 0.6389 | 24.28 | 0.91 | 20.20 | 0.90 | 16.96 | 0.87 | G11 | O.A. |
| 22 | | | | 24.28 | | 20.20 | | 16.96 | | | |

Abbreviations:
A.L.D. Anomalous Low-Dispersion
Anom. Anomaly
C.G. Cover Glass
O.A. Opposite Anomaly
Q.G. Quartz Glass

TABLE 4

Example 2

| i | P | dN/dT (E-6) | Anom. | T Fx | T Fx/Fxmax | M Fx | M Fx/Fxmax | W Fx | W Fx/Fxmax | Element, Group, etc. | |
|---|---|---|---|---|---|---|---|---|---|---|---|
| 23 | | | | 25.55 | | 20.64 | | 19.22 | | | Gr4 |
| | 0.59329 | 0.2 | 0.6568 | 25.71 | 0.96 | 20.82 | 0.93 | 19.31 | 0.99 | G12 | |
| 24 | | | | 25.71 | | 20.82 | | 19.31 | | | |
| 25 | | | | 25.33 | | 20.19 | | 18.83 | | | Gr5 |
| | 0.56544 | 4.9 | 0.6389 | 25.63 | 0.96 | 20.33 | 0.91 | 18.86 | 0.97 | G13 | O.A. |
| 26 | | | | 25.63 | | 20.33 | | 18.86 | | | |
| 27 | | | | 25.63 | | 20.33 | | 18.86 | | | |
| | 0.54259 | 1.9 | 0.6511 | 25.92 | 0.97 | 20.78 | 0.93 | 19.25 | 0.99 | G14 | |
| 28 | | | | 25.92 | | 20.78 | | 19.25 | | | |
| 29 | | | | 26.61 | | 22.32 | | 19.39 | | | Gr6 |
| | 0.52436 | 9.9 | 0.6463 | 26.71 | 1.00 | 22.41 | 1.00 | 19.43 | 1.00 | G15 | Q.G. |
| 30 | | | | 26.71 | | 22.41 | | 19.43 | | | |
| 31 | ST | | | 18.44 | | 18.45 | | 18.44 | | | Gr7 |
| 32 | | | | 16.92 | | 16.93 | | 16.92 | | | |
| | 0.59329 | 0.2 | 0.6568 | 16.92 | 0.63 | 16.93 | 0.76 | 16.92 | 0.87 | G16 | |
| 33 | | | | 16.39 | | 16.41 | | 16.39 | | | |
| 34 | | | | 16.39 | | 16.40 | | 16.39 | | | |
| | 0.56544 | 4.9 | 0.6389 | 16.39 | 0.61 | 16.40 | 0.73 | 16.39 | 0.84 | G17 | |
| 35 | | | | 16.04 | | 16.05 | | 16.04 | | | |
| 36 | | | | 14.92 | | 14.93 | | 14.92 | | | |
| | 0.53743 | −6.2 | 0.6842 | 14.92 | 0.56 | 14.93 | 0.67 | 14.92 | 0.77 | G18 | A.L.D. |
| 37 | | | | 14.49 | | 14.51 | | 14.50 | | | |
| 38 | | | | 13.40 | | 13.41 | | 13.40 | | | |
| | 0.53743 | −6.2 | 0.6842 | 13.40 | 0.50 | 13.41 | 0.60 | 13.40 | 0.69 | G19 | A.L.D. |
| 39 | | | | 12.19 | | 12.20 | | 12.19 | | | |
| 40 | | | | 10.72 | | 10.73 | | 10.72 | | | |
| | 0.56544 | 4.9 | 0.6389 | 10.72 | 0.40 | 10.73 | 0.48 | 10.72 | 0.55 | G20 | |
| 41 | | | | 9.83 | | 9.84 | | 9.83 | | | |
| 42 | | | | 9.22 | | 9.23 | | 9.22 | | | |
| | 0.53743 | −6.2 | 0.6842 | 9.22 | 0.35 | 9.23 | 0.41 | 9.22 | 0.47 | G21 | A.L.D. |
| 43 | | | | 8.64 | | 8.65 | | 8.64 | | | |
| 44 | | | | 7.93 | | 7.94 | | 7.93 | | | |
| | 0.53743 | −6.2 | 0.6842 | 7.93 | 0.30 | 7.94 | 0.35 | 7.93 | 0.41 | G22 | A.L.D. |
| 45 | | | | 7.67 | | 7.67 | | 7.67 | | | |
| 46 | | | | 0.27 | | 0.43 | | 0.27 | | | |
| | 0.53524 | | | | | | | | | | C.G. |

TABLE 4-continued

Example 2

| i | P | dN/dT (E-6) | Anom. | T | | M | | W | | Element, Group, etc. |
|---|---|---|---|---|---|---|---|---|---|---|
| | | | | Fx | Fx/Fxmax | Fx | Fx/Fxmax | Fx | Fx/Fxmax | |
| 47 | | | | | 0.16 | | 0.19 | | 0.16 | |
| 48 | | | | 26.71 | | 22.41 | | 19.43 | | IM |

Abbreviations:
A.L.D. Anomalous Low-Dispersion
Anom. Anomaly
C.G. Cover Glass
O.A. Opposite Anomaly
Q.G. Quartz Glass

TABLE 5

| | | Example 1 | Example 2 |
|---|---|---|---|
| | Negative Element | G11, G13 | G11, G13 |
| Formula (1) | Vd | 40.8 | 40.8 |
| Formula (2) | 0.0018 × Vd + P | 0.6389 | 0.6389 |
| | Positive Element | G15 | G15 |
| Formula (3) | Vd | 67.7 | 67.7 |
| Formula (4) | 0.0018 × Vd + P | 0.6463 | 0.6463 |
| Formula (5) | dN/dT | 9.9 | 9.9 |
| | Positive Element | G18, G19, G21, G22 | G18, G19, G21, G22 |
| Formula (3) | Vd | 81.6 | 81.6 |
| Formula (6) | 0.0018 × Vd + P | 0.6857 | 0.6857 |
| | Positive Element | G15 | G15 |
| Formula (7) | |Fx/Fxmax| | (T): 0.96 (M): 0.93 (W): 0.89 | 1.00 |

TABLE 6

| | Control 1 (G15) | | Example 1 (G15) | | Control 2 (G15) | | Example 2 (G15) | |
|---|---|---|---|---|---|---|---|---|
| Temperature-Compensation Element | dummy glass | | Q.G. | | dummy glass | | Q.G. | |
| Focal Length | 29 | 18 | 29 | 18 | 49.5 | 28 | 49.5 | 28 |
| Focus Deviation (20 to 50° C.) | 0.252 | 0.204 | 0.197 | 0.174 | 0.296 | 0.230 | 0.182 | 0.171 |
| Focus Deviation Variation | 0.049 | | 0.023 | | 0.066 | | 0.010 | |

Note:
Dummy glass is a material having the same Nd and Vd as quartz glass but giving zero as dN/dT.

What is claimed is:

1. A zoom lens system which is used in a spectrum region including visible light and which includes a plurality of movable lens groups that are moved for zooming, the zoom lens system comprising:
in at least one of the movable lens groups, at least one negative lens element made of a material that fulfills conditional formulae (1) and (2) below; and
in at least one of the movable lens groups, at least one positive lens element made of a material that fulfills conditional formulae (3), (4), and (5) below,
the negative and positive lens elements moving in a same direction along an optical axis during zooming:

$$Vd<55 \tag{1}$$

$$0.0018 \times Vd+P<0.65 \tag{2}$$

$$60<Vd \tag{3}$$

$$0.645<0.0018 \times Vd+P \tag{4}$$

$$9 \times 10^{-6}<dN/dT \tag{5}$$

where
Vd represents an Abbe number for a d-line, $$P=(Ng-NF)/(NF-NC),$$

Ng represents a refractive index for a g-line,
NF represents a refractive index for a F-line,
NC represents a refractive index for a C-line, and
dN/dT represents a rate of variation in refractive index accompanying variation in temperature around room temperature.

2. The zoom lens system according to claim 1, further including a stationary lens group to a reduction side of the movable lens groups, and further comprising, in the stationary lens group, at least one positive lens element made of a material that fulfills conditional formula (3) above and conditional formula (6) below:

$$0.67<0.0018 \times Vd+P \tag{6}$$

3. The zoom lens system according to claim 2, wherein
the at least one positive lens element made of the material that fulfills conditional formulae (3), (4), and (5) above fulfills conditional formula (7) below at all zoom positions:

$$0.85<|Fx/Fxmax| \tag{7}$$

where
Fx represents a distance from the optical axis to a ray passing closest to an edge through either an enlargement-side or a reduction-side lens surface thereof, with respect to an axial beam passing through individual lens elements constituting the zoom lens system; and Fxmax represents a maximum value of distances (Fx) from the optical axis to a ray passing closest to an edge through either the enlargement-side or the reduction-side lens surface thereof, with respect to the axial beam passing through individual lens elements constituting the zoom lens system.

4. The zoom lens system according to claim 2, wherein the at least one positive lens element made of the material that fulfills conditional formulae (3), (4), and (5) above is located in a most reduction-side one of the plurality of movable lens groups.

5. The zoom lens system according to claim 2, wherein the material that fulfills conditional formulae (3), (4), and (5) above has, with a thickness of 10 mm, a transmittance of 80% or more to light having a wavelength of 350 nm.

6. The zoom lens system according to claim 5, wherein the material that fulfills conditional formulae (3), (4), and (5) above is quartz glass.

7. The zoom lens system according to claim 1, wherein the at least one positive lens element made of the material that fulfills conditional formulae (3), (4), and (5) above fulfills conditional formula (7) below at all zoom positions:

$$0.85 < |Fx/Fxmax| \quad (7)$$

where

Fx represents a distance from the optical axis to a ray passing closest to an edge through either an enlargement-side or a reduction-side lens surface thereof, with respect to an axial beam passing through individual lens elements constituting the zoom lens system; and Fxmax represents a maximum value of distances (Fx) from the optical axis to a ray passing closest to an edge through either the enlargement-side or the reduction-side lens surface thereof, with respect to the axial beam passing through individual lens elements constituting the zoom lens system.

8. The zoom lens system according to claim 7, wherein the at least one positive lens element made of the material that fulfills conditional formulae (3), (4), and (5) above is located in a most reduction-side one of the plurality of movable lens groups.

9. The zoom lens system according to claim 7, wherein the material that fulfills conditional formulae (3), (4), and (5) above has, with a thickness of 10 mm, a transmittance of 80% or more to light having a wavelength of 350 nm.

10. The zoom lens system according to claim 9, wherein the material that fulfills conditional formulae (3), (4), and (5) above is quartz glass.

11. The zoom lens system according to claim 1, wherein the at least one positive lens element made of the material that fulfills conditional formulae (3), (4), and (5) above is located in a most reduction-side one of the plurality of movable lens groups.

12. The zoom lens system according to claim 1, wherein the material that fulfills conditional formulae (3), (4), and (5) above has, with a thickness of 10 mm, a transmittance of 80% or more to light having a wavelength of 350 nm.

13. The zoom lens system according to claim 12, wherein the material that fulfills conditional formulae (3), (4), and (5) above is quartz glass.

14. A digital appliance comprising:

a zoom lens system which is used in a spectrum region including visible light and which includes a plurality of movable lens groups that are moved for zooming; and an image sensor which converts an optical image formed on a sensing surface thereof into an electrical signal, the digital appliance being thereby additionally furnished with at least one of a function of shooting a still image of a subject and a function of shooting a moving image of a subject, wherein the zoom lens system is arranged such that an optical image of a subject is formed on the sensing surface of the image sensor, and comprises:

in at least one of the movable lens groups, at least one negative lens element made of a material that fulfills conditional formulae (1) and (2) below; and in at least one of the movable lens groups, at least one positive lens element made of a material that fulfills conditional formulae (3), (4), and (5) below, the negative and positive lens elements moving in a same direction along an optical axis during zooming:

$$Vd < 55 \quad (1)$$

$$0.0018 \times Vd + P < 0.65 \quad (2)$$

$$60 < Vd \quad (3)$$

$$0.645 < 0.0018 \times Vd + P \quad (4)$$

$$9 \times 10^{-6} < dN/dT \quad (5)$$

where

Vd represents an Abbe number for a d-line, $P = (Ng-NF)/(NF-NC)$,

Ng represents a refractive index for a g-line,

NF represents a refractive index for a F-line,

NC represents a refractive index for a C-line, and dN/dT represents a rate of variation in refractive index accompanying variation in temperature around room temperature.

15. The digital appliance according to claim 14, further including a stationary lens group to a reduction side of the movable lens groups, and further comprising, in the stationary lens group, at least one positive lens element made of a material that fulfills conditional formula (3) above and conditional formula (6) below:

$$0.67 < 0.0018 \times Vd + P \quad (6).$$

16. The digital appliance according to claim 14, wherein the at least one positive lens element made of the material that fulfills conditional formulae (3), (4), and (5) above fulfills conditional formula (7) below at all zoom positions:

$$0.85 < |Fx/Fxmax| \quad (7)$$

where

Fx represents a distance from the optical axis to a ray passing closest to an edge through either an enlargement-side or a reduction-side lens surface thereof, with respect to an axial beam passing through individual lens elements constituting the zoom lens system; and Fxmax represents a maximum value of distances (Fx) from the optical axis to a ray passing closest to an edge through either the enlargement-side or the reduction-side lens surface thereof, with respect to the axial beam passing through individual lens elements constituting the zoom lens system.

17. A projector comprising:
an image display device which displays an image;
a light source;
an illumination optical system which directs light from the light source to the image display device; and
a zoom lens system which projects the image displayed on the image display device onto a screen surface on an enlarged scale, wherein
the zoom lens system comprises:
in at least one movable lens group, at least one negative lens element made of a material that fulfills conditional formulae (1) and (2) below; and
in at least one movable lens group, at least one positive lens element made of a material that fulfills conditional formulae (3), (4), and (5) below,
the negative and positive lens elements moving in a same direction along an optical axis during zooming:

$$Vd<55 \tag{1}$$

$$0.0018 \times Vd+P<0.65 \tag{2}$$

$$60<Vd \tag{3}$$

$$0.645<0.0018 \times Vd+P \tag{4}$$

$$9 \times 10^{-6}<dN/dT \tag{5}$$

where
Vd represents an Abbe number for a d-line, $$P=(Ng-NF)/(NF-NC),$$

Ng represents a refractive index for a g-line,
NF represents a refractive index for a F-line,
NC represents a refractive index for a C-line, and
dN/dT represents a rate of variation in refractive index accompanying variation in temperature around room temperature.

18. The projector according to claim 17, further including a stationary lens group to a reduction side of the movable lens group, and further comprising, in the stationary lens group, at least one positive lens element made of a material that fulfills conditional formula (3) above and conditional formula (6) below:

$$0.67<0.0018 \times Vd+P \tag{6}$$

19. The projector according to claim 17, wherein
the at least one positive lens element made of the material that fulfills conditional formulae (3), (4), and (5) above fulfills conditional formula (7) below at all zoom positions:

$$0.85<|Fx/Fx\max| \tag{7}$$

where
Fx represents a distance from the optical axis to a ray passing closest to an edge through either an enlargement-side or a reduction-side lens surface thereof, with respect to an axial beam passing through individual lens elements constituting the zoom lens system; and
Fxmax represents a maximum value of distances (Fx) from the optical axis to a ray passing closest to an edge through either the enlargement-side or the reduction-side lens surface thereof, with respect to the axial beam passing through individual lens elements constituting the zoom lens system.

* * * * *